US006927831B2

(12) United States Patent
Hagiwara

(10) Patent No.: US 6,927,831 B2
(45) Date of Patent: Aug. 9, 2005

(54) LIQUID CRYSTAL DEVICE AND ELECTRONIC APPARATUS HAVING A SUBSTANTIALLY UNIFORM SUBSTRATE INTERVAL

(75) Inventor: Takeshi Hagiwara, Matsumoto (JP)

(73) Assignee: Seiko Epson Corporation (JP)

( * ) Notice: Subject to any disclaimer, the term of this patent is extended or adjusted under 35 U.S.C. 154(b) by 35 days.

(21) Appl. No.: 10/243,962

(22) Filed: Sep. 13, 2002

(65) Prior Publication Data
US 2003/0058395 A1 Mar. 27, 2003

(30) Foreign Application Priority Data
Sep. 13, 2001 (JP) ........................................ 2001-278777

(51) Int. Cl.[7] .................... G02F 1/1345; G02F 1/1339
(52) U.S. Cl. .................... 349/149; 349/152; 349/153
(58) Field of Search .................... 349/149.152, 153

(56) References Cited

U.S. PATENT DOCUMENTS

| 5,619,358 A | * | 4/1997 | Tanaka et al. | 349/143 |
|---|---|---|---|---|
| 5,982,470 A | * | 11/1999 | Nakahara et al. | 349/153 |
| 6,577,371 B2 | * | 6/2003 | Hirabayashi | 349/149 |
| 2002/0163611 A1 | * | 11/2002 | Kamijima et al. | 349/122 |

FOREIGN PATENT DOCUMENTS

| JP | 3-24523 | | 2/1991 |
|---|---|---|---|
| JP | 03-170916 A | * | 7/1991 |
| JP | 4-324825 | | 11/1992 |
| JP | 06-051332 A | * | 2/1994 |
| JP | 08-271914 | * | 10/1996 |
| JP | 08-271914 A | * | 10/1996 |
| JP | 09-179131 | | 7/1997 |
| JP | 10-10551 | | 1/1998 |
| JP | 11-101984 A | * | 4/1999 |
| JP | 11-109370 | | 4/1999 |
| JP | 11-149087 A | * | 6/1999 |
| JP | 11-190852 | * | 7/1999 |
| JP | 2000-75312 | | 3/2000 |
| JP | 2000-221537 | | 8/2000 |
| JP | 2000-347225 A | * | 12/2000 |
| JP | WO 9700462 | | 1/2001 |

OTHER PUBLICATIONS

Japanese Examination Report, Japanese Application No. 2001–278777.

* cited by examiner

Primary Examiner—Tarifur R. Chowdhury
(74) Attorney, Agent, or Firm—Harness, Dickey & Pierce, P.L.C.

(57) ABSTRACT

A liquid crystal device comprises a pair of substrates 3a and 3b bonded to each other with a sealing member 4, a conductive member 5 disposed in the sealing member 4 in place, a pair of wirings 29b and 33 connected to each other via the conductive member 5 in a conductive area 31 set in the sealing member 4 in place, and a first dummy pattern 34 which runs through the part of the sealing member 4 opposite to the conductive area 31. The cell thickness, which may become uneven due to the wiring 29b and the wiring 33 running through the sealing member 4, is prevented from becoming irregular by providing a first dummy pattern 34.

12 Claims, 23 Drawing Sheets

LIQUID CRYSTAL DEVICE AND ELECTRONIC APPARATUS HAVING A SUBSTANTIALLY UNIFORM SUBSTRATE INTERVAL

BACKGROUND OF THE INVENTION

1. Technical Field of the Invention

The present invention relates to a liquid crystal device having a structure in which wirings formed on a pair of substrates opposed to each other are electrically connected to each other with a conductive member interposed between the substrates. Moreover, the present invention relates to an electronic apparatus formed using the liquid crystal device.

2. Description of the Related Art

Liquid crystal devices are widely used in display units of electronic apparatuses such as portable computers, portable telephones, video cameras, and so forth. To form such a liquid crystal device, generally, a pair of substrates having electrodes formed thereon, respectively, are bonded to each other with a circular sealing member in such a manner that the electrodes are opposed to each other, and a liquid crystal is sealed into the area surrounded by the pair of substrates and the sealing member. In the liquid crystal display, images such as letters, figures, graphics, and so forth are displayed by controlling for each pixel the alignment of the liquid crystal filled in the pair of substrates.

The above-described liquid crystal devices include those of a simple matrix system not using an active element and those of an active matrix system using an active element. As the active element, TFD (Thin film Diode) elements which are two terminal active elements and TFT (Thin Film Transistor) elements which are three terminal active elements and so forth are known.

Conventionally, as the simple matrix system liquid crystal device, for example, a device such as that shown in FIG. 12 has been known. To form the liquid crystal device shown here, a lighting device such as a back light or the like, a control substrate, and other accessories provided if necessary are mounted onto a liquid crystal panel 101 shown in the drawing.

The liquid crystal panel 101 is formed by bonding a pair of substrates 102a and 102b made of glass with a circular sealing member 103.

A liquid crystal injection port 103a is provided in the sealing member 103. A number of conductive members 106 are incorporated inside the sealing member 103.

The gap surrounded by the sealing member 103 and between the substrates 102a and 102b is a so-called cell gap. A liquid crystal (not shown) is injected into the cell gap through the liquid crystal injection port 103a, and the port 103a is then sealed with a resin or the like. One substrate 102a of the substrates has a protruding portion 102c which protrudes outward of the substrate 102b. ICs 104a and 104b for driving a liquid crystal are mounted onto the surface (the surface on the back side of the drawing paper as viewed in FIG. 12) of the protruding portion 102c.

A plurality of linear electrodes 107a are arrayed parallel to each other so as to form, as a whole, a stripe pattern on the liquid crystal side surface (that is, on the surface behind drawing paper of FIG. 12) of the substrate 102a as shown in FIG. 13. Moreover, wirings 108a are formed so as to extend from the ends of the electrodes 107a toward the mounting area of the liquid crystal driving IC 104a (see FIG. 12) on the substrate-protruding portion 102c. Wirings 108b extend from the mounting area of the liquid crystal driving ICs 104b (see FIG. 12), pass through the area in which the sealing member 103 is formed, and enter the area to be filled with a liquid crystal.

A plurality of linear electrodes 107b are arrayed parallel to each other so as to form, as a whole, a stripe pattern on the liquid crystal side surface (that is, on the front surface side of the drawing paper of FIG. 12) of the other substrate 102b as shown in FIG. 14. Moreover, wirings 109 are formed so as to extend from the ends of the electrodes 107b and run slightly past the area in which the sealing member 103 is formed.

In FIGS. 12, 13, and 14, only several of the electrodes 107a, the electrodes 107b, the wirings 108a, 108b, and 109, and so forth are schematically shown at larger intervals compared with practical intervals. In the practical liquid crystal device, a larger number of the electrodes 107a or the like are arrayed at smaller intervals.

To form the liquid crystal panel 101 shown in FIG. 12, the sealing member 103 is formed on either the substrate 102a shown in FIG. 13 or the substrate 102a shown in FIG. 14, the substrate 102a and the substrate 102b are bonded to each other with the sealing member 103 being sandwiched between them in such a manner that the electrodes 107a and the electrodes 107b are orthogonal to each other, and moreover, the sealing member 103 is hardened. Furthermore, the liquid crystal driving ICs 104a and 104b are mounted onto the surface of the protruding portion 102c of the substrate 102a in such a manner that the terminals, that is, the bumps are electrically connected to the wirings 108a and 108b.

When the two substrates 102a and 102b are bonded to each other as described above, the wirings 108b shown in FIG. 13 and the wirings 109 shown in FIG. 14 overlap each other with the conductive members 106 being sandwiched between them in the conductive area 111, and thereby, the wirings 108b on the substrate 102a side and the wirings 109 on the substrate 102b side are electrically connected to each other. Thus, the liquid crystal driving ICs 104b on the substrate 102a side and the electrodes 107a on the substrate 102b side are electrically connected to each other.

Referring to the liquid crystal panel 101 formed as described above, the intersecting point of an electrode 107a and an electrode 107b and the liquid crystal held at the intersecting point constitutes one pixel. The plurality of pixels is arrayed in a dot matrix pattern to form a display area, that is, a driving area V. Images such as letters, figures, and so forth are formed in the display area V.

Referring to the above-described conventional liquid crystal device, the wirings 108b on the substrate 102a side run through the sealing member 103, and also, the wirings 109 on the substrate 102b side run through the sealing member 103 in the conductive areas 111 formed in one side of the sealing member 103. However, no patterns equivalent to the wirings 108b or the like are formed in the partial areas 112 of the sealing member 103 opposite to the conductive areas 111, respectively.

Therefore, the thickness of the cell gap in the conductive areas 111 is relatively large, and that of the cell gap in the partial areas opposite to the areas 112 is small. Thus, there are caused problems in that the overall cell gap of the liquid crystal panel 101 becomes non-constant or uneven. Accordingly, problems occur in that voltage applied to the respective pixels become different, so that some un-clear images are obtained.

In view of the foregoing, the present invention has been devised. An object of the present invention is to reduce the unevenness of the interval between the substrates, that is, to reduce irregularities of the cell thickness in the liquid crystal panel by modifying patterns to be formed on the substrates forming the liquid crystal device, so that the liquid crystal display qualities are enhanced.

SUMMARY OF THE INVENTION

To achieve the above-described object, a liquid crystal device of the present invention comprises a pair of substrates bonded to each other with a sealing member, a conductive member disposed in the sealing member in place, a pair of wirings connected to each other via the conductive member in a conductive area set in the sealing member in place, and a first dummy pattern which runs through a part of the sealing member opposite to the conductive area.

According to the liquid crystal device having the above-described configuration, the wirings run through the sealing member in the conductive area, and the first dummy pattern runs through the part of the sealing member opposite to the conductive area. With this configuration, the interval between the substrates, that is, the cell gap can be kept constant all over the liquid crystal panel compared with a conventional liquid crystal device having the structure in which wirings run through only the conductive area of the sealing member. Thereby, the liquid crystal display qualities can be kept on a high level.

Next, referring to another liquid crystal device of the present invention, in Article (1), a dimension for the first dummy pattern to run through the sealing member is substantially equal to a dimension for the wirings to run through the sealing member in the conductive area. Thereby, the conditions dictating the dimension on the dummy pattern side for the sealing member become the same as those about the dimension on the wirings side. Therefore, the cell gap of the liquid crystal panel can be kept more constant.

Referring to still another liquid crystal device of the present invention, in the liquid crystal device having the constitution described in Article (1) or (2), the first dummy pattern comprises a set of a plurality of linear dummy pattern elements formed in positions corresponding to the wirings present in the conductive area, respectively. Thereby, the conditions dictating the dimension on the dummy pattern side for the sealing member become the same as those about the dimension on the wirings side. Therefore, the cell gap of the liquid crystal panel can be kept more constant.

Next, referring to yet another liquid crystal device of the present invention, in the liquid crystal device having the constitution described in Article (3), the width of the respective dummy pattern elements is substantially equal to the width of the corresponding wirings. With this configuration, the conditions dictating the dimension on the dummy pattern side for the sealing member become the same as those about the dimension on the wirings side. Therefore, the cell gap of the liquid crystal panel can be kept more constant.

Referring to another liquid crystal device of the present invention, in the liquid crystal device described in Article (1), one or both of the pair of wirings run through a second area of the sealing member excluding the conductive area.

The wirings are formed outside the sealing member, or the wirings are formed inside the sealing member and outside the display area in liquid crystal devices. When the wirings are formed outside the sealing member, it may be less probable that the wirings run through the sealing member in an area excluding the conductive area. On the other hand, when the wirings are formed inside the sealing member and outside the display area, it is highly probable that one of the pair of wirings which are electrically connected in the conductive area runs through a part of the sealing member excluding the conductive area.

When the wiring runs through a part of the sealing member excluding the conductive area, a second dummy pattern may be provided in the partial area of the sealing member opposite to the part of the sealing member. Thereby, the interval between the substrates of the liquid crystal panel, namely, the cell gap can be kept constant all over the liquid crystal panel, and thus, the liquid crystal display qualities can be kept on a high level.

Next, referring to another liquid crystal device of the present invention, in the liquid crystal device having the configuration described in Article (5), a dimension for the second dummy pattern to run through the sealing member is substantially equal to a dimension for the wirings to run through the sealing member in the second area. Thus, the conditions dictating the dimension on the dummy pattern side for the sealing member become the same as those about the dimension on the wirings side. Therefore, the cell gap of the liquid crystal panel can be kept more constant.

Next, referring to still another liquid crystal device of the present invention, in the liquid crystal device having the configuration described in Article (5) or (6), the second dummy pattern comprises a set of a number of linear dummy pattern elements formed in positions corresponding to the wirings present in the second area, respectively. Thus, the conditions dictating the dimension on the dummy pattern side for the sealing member become the same as those about the dimension on the wirings side. Therefore, the cell gap of the liquid crystal panel can be kept more constant.

Referring to yet another liquid crystal device of the present invention, in the liquid crystal device having the configuration described in Article (7), the width of the respective dummy pattern elements is substantially equal to the width of the corresponding wirings. Thus, the conditions dictating the dimension on the dummy pattern side for the sealing member become the same as those about the dimension on the wirings side. Therefore, the cell gap of the liquid crystal panel can be kept more constant.

Another liquid crystal device of the present invention comprises a pair of substrates bonded to each other with a sealing member, one of the substrates having a wiring-lead-out area, a conductive member disposed in the sealing member, conductive areas formed in place on a pair of the opposite sides of the sealing member sandwiching a display area and extending in such a direction as to intersect the wiring-lead-out area, a pair of wirings connected to each other with the conductive member in each conductive area, one of the wirings being extended to the wiring-lead-out area, the other being extended to the display area, and a first dummy pattern which runs through a part of the sealing member opposite to the corresponding one of conductive areas.

In the liquid crystal device having the above-described configuration, the wirings run through the sealing member in the conductive areas, and the first dummy pattern runs through parts of the sealing member opposite to the conductive areas, respectively. With this configuration, the interval between the substrates, namely, the cell gap can be kept constant all over the liquid crystal panel, compared with a conventional liquid crystal device in which wirings run through only conductive area of the sealing member. Thereby, the liquid crystal display qualities can be kept on a high level.

Next, referring to still another liquid crystal device of the present invention, in the liquid crystal device having the configuration described in Article (9), a dimension for the first dummy pattern to run through the sealing member is substantially equal to a dimension for the wirings to run through the sealing member in the conductive area. Thus, the conditions dictating the dimension on the dummy pattern side for the sealing member become the same as those about the dimension on the wirings side. Therefore, the cell gap of the liquid crystal panel can be kept more constant.

Next, referring to another liquid crystal device of the present invention, in the liquid crystal device having the configuration described in Article (9) or (11), the first dummy pattern comprises a set of a plurality of linear dummy pattern elements formed in the positions corresponding to the wirings present in the conductive area, respectively. Thus, the conditions dictating the dimension on the dummy pattern side for the sealing member become the same as those about the dimension on the wirings side. Therefore, the cell gap of the liquid crystal panel can be kept more constant.

Referring to still another liquid crystal device of the present invention, in the liquid crystal device having the configuration described in Article (11), the width of the respective dummy pattern elements is substantially equal to the width of the corresponding wirings. Thus, the conditions dictating the dimension on the dummy pattern side for the sealing member become the same as those about the dimension on the wirings side. Therefore, the cell gap of the liquid crystal panel can be kept more constant.

Referring to yet another liquid crystal device of the present invention, in the liquid crystal device having the configuration described in Article (9), one or both of the pair of wirings run through a second area of the sealing member excluding the conductive area, and a second dummy pattern is provided which run through a part of the sealing member opposite to the second area.

The wirings are formed outside the sealing member, or the wirings are formed inside the sealing member and outside the display area in liquid crystal devices. When the wirings are formed outside the sealing member, it may be less probable that the wirings run through the sealing member in an area excluding the conductive area. On the other hand, when the wirings are formed inside the sealing member and outside the display area, it is highly probable that one of the pair of wirings which are electrically connected in the conductive area runs through a part of the sealing member excluding the conductive area.

When the wiring runs through a part of the sealing member excluding the conductive area as described above, a second dummy pattern may be provided in the partial area of the sealing member opposite to the part of the sealing member. Thereby, the interval between the substrates of the liquid crystal panel, namely, the cell gap can be kept constant all over the liquid crystal panel, and thus, the liquid crystal display qualities can be kept on a high level.

(14) Referring to another liquid crystal device of the present invention, in the liquid crystal device having the configuration described in Article (13), a dimension for the second dummy pattern to run through the sealing member is substantially equal to a dimension for the wirings to run through the sealing member in the second area. Thus, the conditions dictating the dimension on the dummy pattern side for the sealing member become the same as those about the dimension on the wirings side. Therefore, the cell gap of the liquid crystal panel can be kept more constant.

(15) Referring to another liquid crystal device of the present invention, in the liquid crystal device having the configuration described in Article (13) or (14), the second dummy pattern comprises a set of a plurality of linear dummy pattern elements formed in positions corresponding to the wirings present in the second area, respectively. Thus, the conditions dictating the dimension on the dummy pattern side for the sealing member become the same as those about the dimension on the wirings side. Therefore, the cell gap of the liquid crystal panel can be kept more constant.

(16) Next, referring to still another liquid crystal device of the present invention, in the liquid crystal device having the configuration described in Article (15), the width of the respective dummy pattern elements is substantially equal to the width of the corresponding wirings. Thus, the conditions dictating the dimension on the dummy pattern side for the sealing member become the same as those about the dimension on the wirings side. Therefore, the cell gap of the liquid crystal panel can be kept more constant.

(17) Referring to the electronic apparatus of the present invention, in the electronic apparatus containing a liquid crystal device and a case accommodating the liquid crystal device, the liquid crystal device is the liquid crystal device defined in any one of Articles (1) to (16). In this electronic apparatus, the interval between the substrates of the liquid crystal panel, namely, the cell gap in the built-in liquid crystal device can be kept constant all over the liquid crystal panel. Thereby, the liquid crystal display qualities can be kept on a high level, and information with respect to the electronic apparatus can be clearly visualized.

DETAILED DESCRIPTION OF THE PREFERRED EMBODIMENTS (First Embodiment of Liquid Crystal Device)

Figure 1:
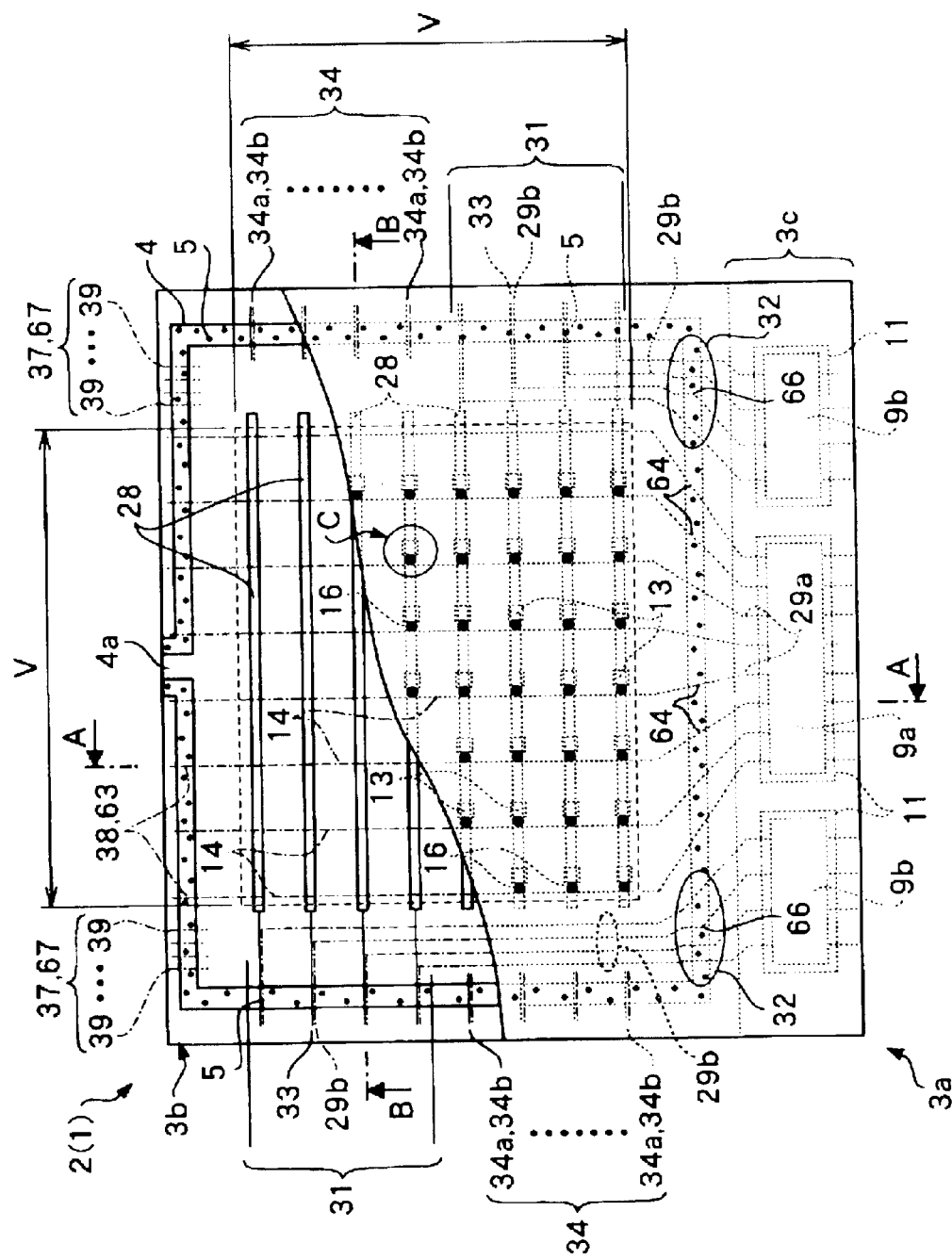
FIG. 1 is a partially cut-out plan view of a liquid crystal device according to an embodiment of the present invention.

FIG. 1 shows an embodiment in which the present invention is applied to an active matrix type liquid crystal device using TFD (Thin Film Diode) elements as switching elements. The liquid crystal device has a structure in which IC chips are directly mounted onto a substrate, in other words, constructed by a so-called COG (Chip On Glass) system.

A liquid crystal device 1 shown here has a configuration in which a lighting device, a control substrate, and other accessories are provided on a liquid crystal panel 2 having the plan-structure shown in FIG. 1. The liquid crystal panel 2 is formed by joining, that is, bonding a first substrate 3a arranged at the front side as viewed in FIG. 1 and a second substrate 3b positioned on the back side as viewed in FIG. 1 to each other with a circular sealing member 4. Conductive members 5 for electrically connecting the first substrate 3a and the second substrate 3b to each other are dispersed and contained in the sealing member 4.

Figure 2:
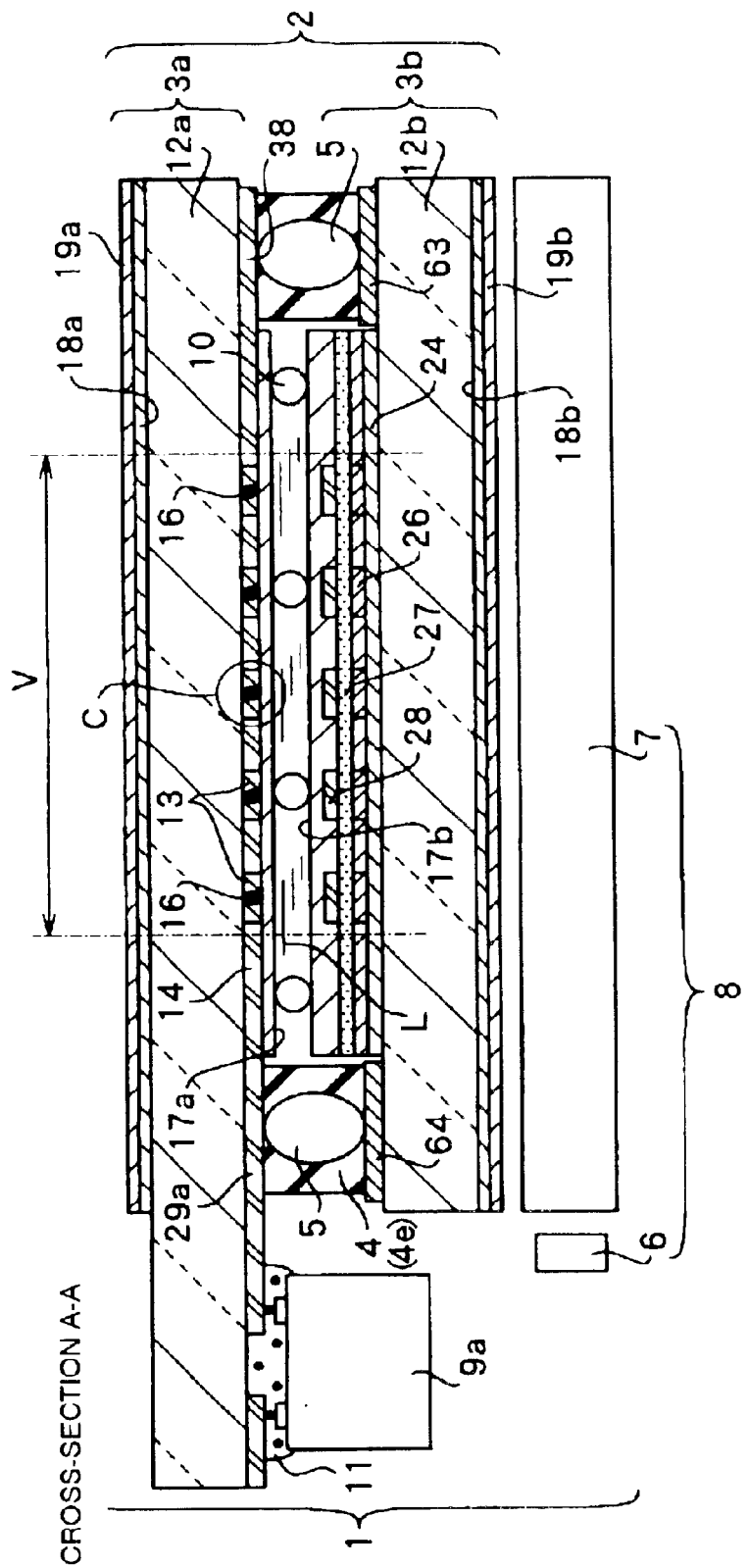
FIG. 2 is a cross-sectional view showing the cross-sectional structure of the liquid crystal device taken along line A—A in FIG. 1.

The area surrounded by the sealing member 4, the first substrate 3a, and the second substrate 3b has an interval with a constant height, namely, a cell gap. As shown in FIG. 2, the cell gap is kept at a constant size by means of a number of spacers 10 distributed along the surface of one of the substrates 3a and 3b. The spacers 10 are formed, e.g., into spheres. Moreover, a liquid crystal injecting port 4a is formed in a part of the sealing member 4. A liquid crystal is injected into the cell gap through the liquid crystal injecting port 4a. After completion of the injection, the liquid crystal injecting port 4a is sealed with a resin or the like.

FIG. 2 is a cross-sectional view of the liquid crystal device 1 taken along line A—A in FIG. 1. As shown in FIG. 2, a lighting device 8 comprising a light-emitting source 6 and a light-guide 7 is provided as a back light on the back side of the second substrate 3b of the liquid crystal panel 2 (on the lower side of the structure as viewed in FIG. 2).

In FIG. 1, the first substrate 3a comprises a substrate-protruding portion 3c which protrudes outward of the second substrate 3b and is used as a wiring-lead-out area. ICs 9a and 9b for driving liquid crystals are mounted onto the substrate-protruding portion 3c by using a conductive adhesion element, e.g., ACF (Anisotropic Conductive Film) 11. The liquid crystal driving IC 9a and the liquid crystal driving ICs 9b have different characteristics. The two types of liquid crystal driving ICs are used, since voltages for use on the first substrate 3a side and on the second substrate 3b side, in other words, for a scanning line driving system and for a signal line driving system, are different from each other. Only one type of IC chip would fail to satisfy these voltages.

As shown in FIG. 2, the first substrate 3a comprises a base member 12a, and a plurality of pixel electrodes 13 are formed on the inner surface, that is, on the liquid crystal layer L side surface of the base member 12a. Moreover, as shown in FIG. 1, a plurality of linear line-wirings 14 are arranged parallel to each other on the inner surface of the first substrate 3a. That is, as a whole, the wirings are formed in a stripe pattern. TFD elements 16 are formed along the line-wirings 14 at appropriate intervals. A plurality of pixel electrodes 13 are formed via these TFD elements 16. The pixel electrodes 13 are arrayed in a dot matrix pattern in a plan view.

In FIG. 2, an alignment film 17a is formed on the surface of the base member 12a having the pixel electrodes 13, the TFD elements 16, and line wirings 14 formed thereon. Furthermore, a retardation film 18a is provided on the outer surface of the base member 12a, and moreover, a polarizer film 19a is formed thereon.

Figure 3:
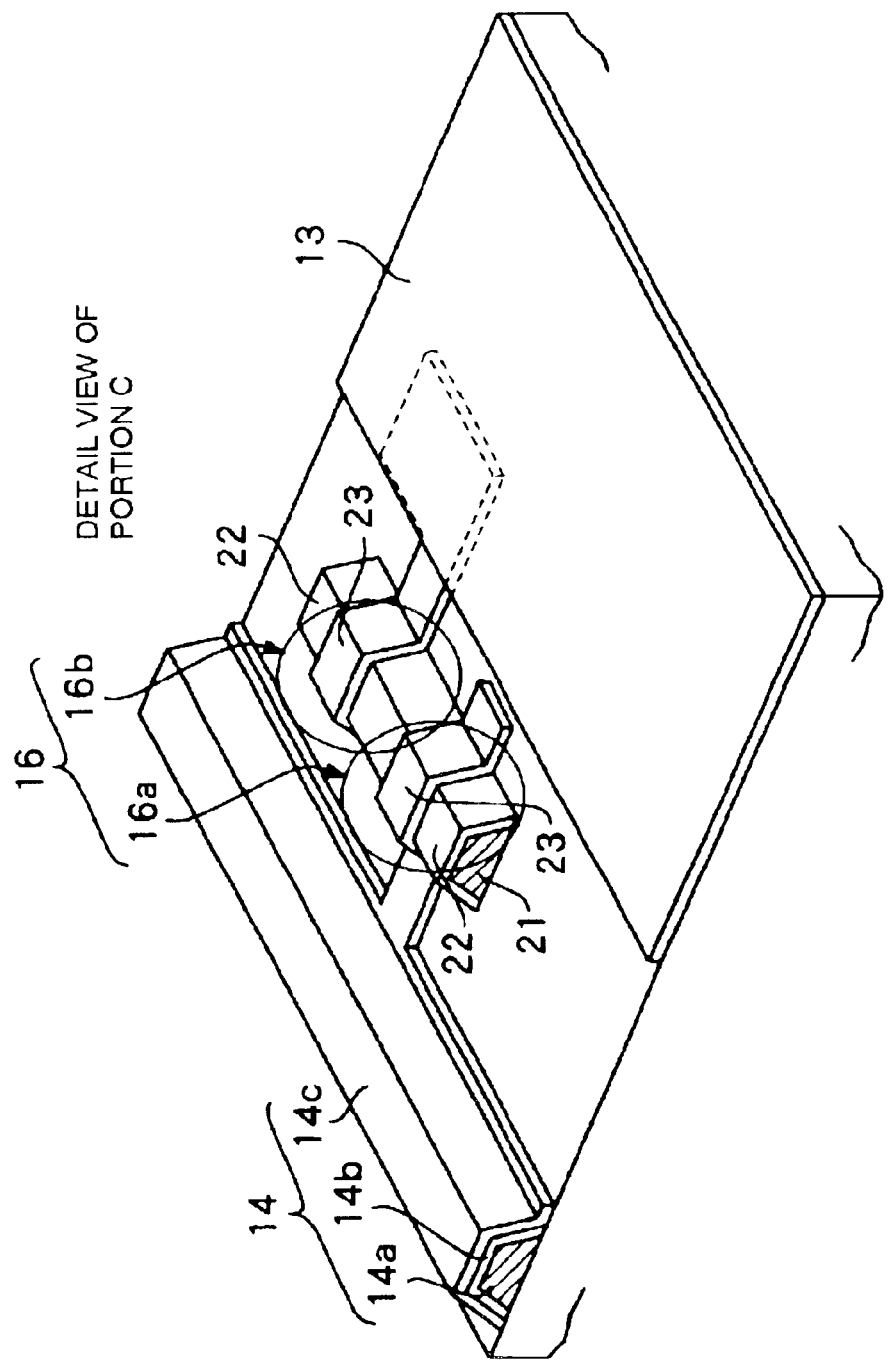
FIG. 3 is a perspective view of an example of a TFD element used in the liquid crystal device of FIG. 1.

FIG. 3 illustrates the structure of the TFD element and its adjacent part indicated by arrow C as shown in FIGS. 1 and 2. The TFD element shown in FIG. 3 has a so-called Back-to-Back structure. In FIG. 3, the line wiring 14 is formed to have a three-layer structure which comprises a first layer 14a, e.g., made of TaW (tantalum tungsten), a second layer 14b, e.g., made of $Ta_2O_5$ (tantalum oxide) as an anodized film, and a third film 14c, e.g., made of Cr (Chromium).

The TFD element 16 comprises a first TFD element 16a and a second TFD element 16b which are connected in series with each other. Each of the first TFD element 16a and the second TFD element 16b has a three layer lamination structure which comprises a first metal layer 21 made of TaW, an insulating layer 22 made of $Ta_2O_5$ and formed by anodization, and a second metal layer 23 made of Cr which is the same as the third layer 14c of the line wiring 14.

The first TFD element 16a, when seen from the line wiring 14 side, has a lamination structure comprising a second metal layer 23, an insulating layer 22, and a first metal layer 21. On the other hand, the second TFD element 16b, when seen from the line wiring 14 side, has a lamination structure comprising the first metal layer 21, the insulating layer 22, and the second metal layer 23. As described above, the first TFD element 16a and the second TFD element 16b are connected in series with each other in the electrically opposite directions to constitute the TFD element having the back-to-back structure. Thus, stabilization of the switching characteristic of the TFD element is attained. The pixel electrode 13 is made of, e.g., ITO, and formed so as to be connected to the second metal layer 23 of the second TFD element 16b.

Referring to FIG. 2, the second substrate 3b comprises a base member 12b. A transflective film 24 is formed on the inner surface, that is, on the liquid crystal layer side surface of the base member 12b, and a color filter film 26 is formed thereon. Moreover, an overcoat film 27 is formed thereon. Opposed electrodes 28 are provided thereon. Furthermore, an alignment film 17b is formed thereon. Moreover, a retardation film 18b is formed on the outer surface of the base member 12b. Furthermore, a polarizer film 19b is formed thereon.

Regarding the opposed electrodes 28, a number of linear electrodes are arrayed in parallel to each other so as to intersect the line wirings 14, as shown in FIG. 1. That is, the opposed electrodes are formed in a stripe pattern.

It should be noted that in FIG. 1, the opposed electrodes 28 are schematically depicted at relatively large intervals in order to facilitate understanding of the drawing, but in practice, the opposed electrodes 28 are formed at very short intervals so as to conform to the dot pitch of the pixel electrodes 13.

The intersecting points of the pixel electrodes 13 and the opposed electrodes 28 are arrayed in a dot matrix pattern. Each of these intersecting points constitutes one dot. Each of the color patterns of the color filter films 26 shown in FIG. 2 corresponds to one dot. In the respective color filter films 26, for example, one unit comprising three primary colors, that is, R (red), G (green), and B (blue) constitutes one pixel. The rectangular area V which is sectioned by a plurality of dots arrayed in the dot matrix pattern is an area in which an image is displayed by driving the switching elements, namely, the area V is a drive area or display area.

The base members 12a and 12b are made of glass, plastics, or the like. The transflective film 24 is made of a material with a light reflecting property such as Al (aluminum). To achieve the functions of transflection and reflection, the light-reflecting material is formed in such a manner as to have a small thickness that allows the material to transmit light or as to have openings for transmitting light at an appropriate area in the transflective film 24 with proper area ratio.

The color filter film 26 is formed by applying pigments in an appropriate pattern such as a mosaic array, a stripe array, a delta array, or the like by a well-known color picture element formation method such as an inkjet method, a color dispersion method, or the like. Moreover, the overcoat film 27 is formed by uniformly applying an appropriate light-transmissive resin by a spin-coating method, a roll-coating method, or the like.

The pixel electrodes 13 and the opposed electrodes 28 are formed by depositing ITO (Indium Tin Oxide) using a well-known film-forming method such as sputtering, vacuum deposition, or the like. Moreover, the film is processed by photo-etching into a desired pattern. The alignment films 17a and 17b are formed e.g., by a method of applying a polyimide solution and then firing, an offset printing method, or the like.

Figure 4:
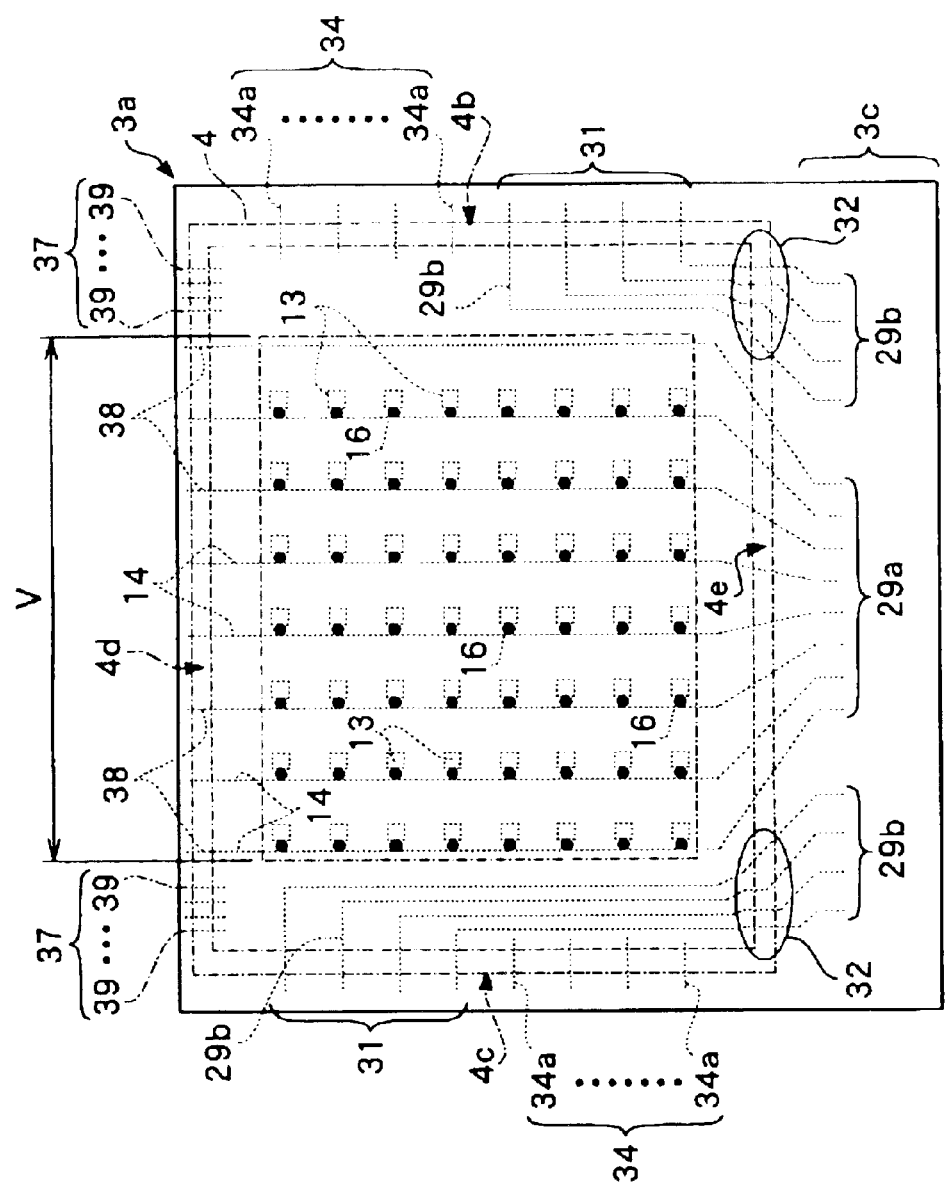
FIG. 4 is a plan view of one of the substrates constituting the liquid crystal device of FIG. 1.

Referring to FIG. 4, the wirings 29a are formed on the liquid crystal side surface (that is, on the surface on the backside as viewed in FIG. 4) of the first substrate 3a so as to extend from the line wirings 14 in the direction of the substrate-protruding portion 3c. Moreover, conductive areas 31 are formed in place on a pair of sides 4b and 4c of the sealing member, the sides extending in such a direction as to intersect the substrate-protruding portion 3c of the first substrate 3a and being opposed to each other while sandwiching the display area V. The wirings 29b are formed between the conductive areas 31 and the IC mounting areas of the substrate-protruding portion 3c, respectively. In this case, the wirings 29b extend so as to run through the sealing member 4 in second areas 32 thereof excluding the conductive areas 31 and to extend to the substrate-protruding portion 3c.

Figure 5:
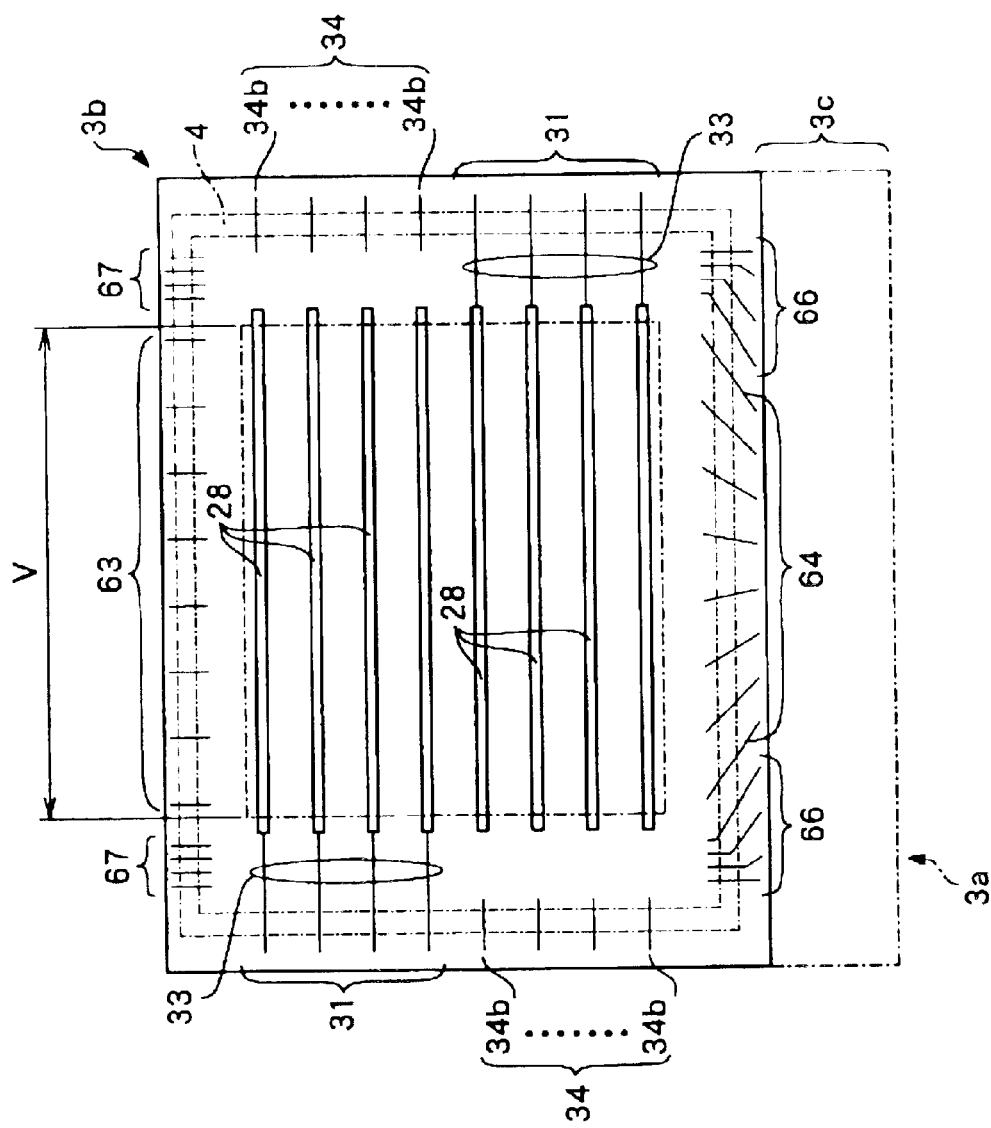
FIG. 5 is a plan view of the other substrate constituting the liquid crystal device of FIG. 1.

Referring to FIG. 5, wirings 33 are formed on the surface on the liquid-crystal side surface (that is, on the front-side surface of FIG. 5) of the second substrate 3b to extend between the opposed electrodes 28 and the conductive areas 31, that is, between the display area and the conductive areas 31, respectively.

Figure 20:
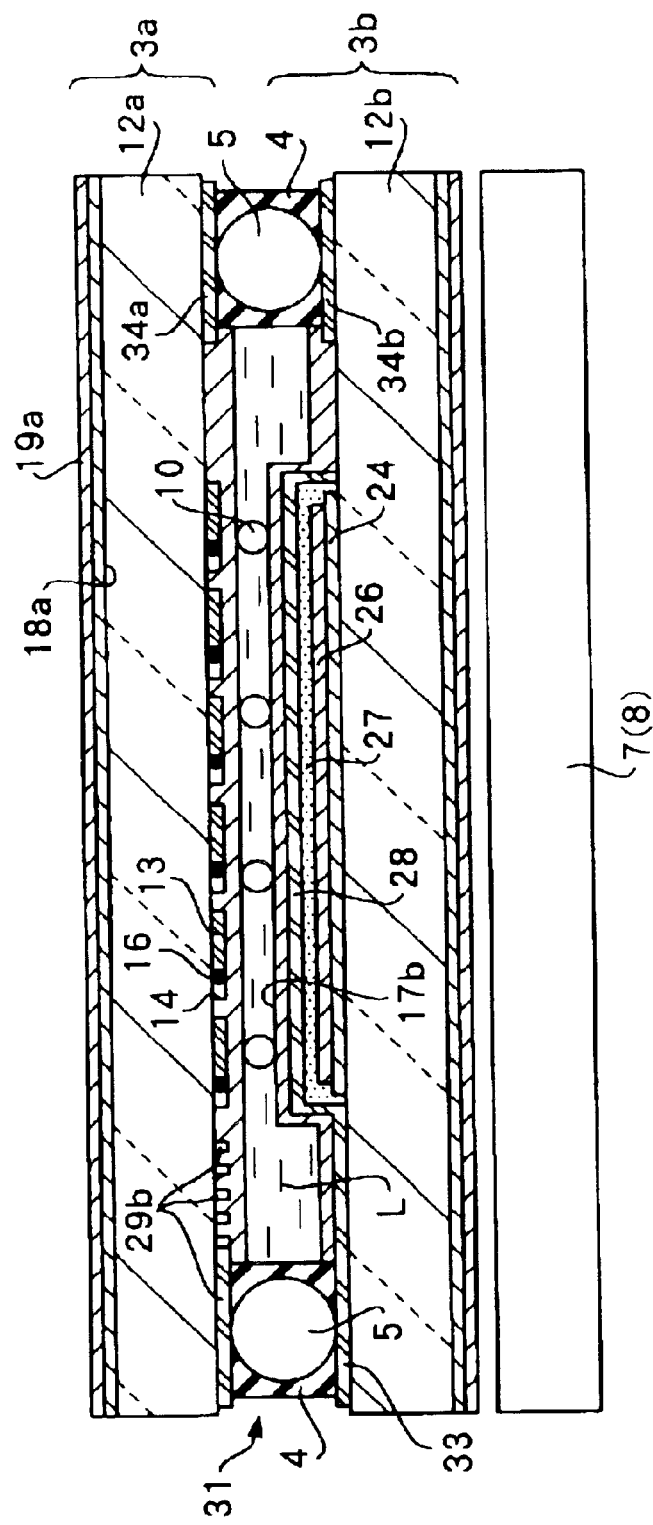
FIG. 20 is a cross-sectional view taken along line B—B in FIG. 1.

The sealing member 4 is formed on the liquid crystal side surface of either the first substrate 3a shown in FIG. 4 or the second substrate 3b shown in FIG. 5 to be circular by printing or the like. The substrates 3a and 3b are bonded to each other with the sealing member 4 being sandwiched between them. Thus, the liquid crystal panel 2 shown in FIG. 1 is formed. In this case, as shown in FIG. 20, the wirings 29b on the first substrate 3a side and the wirings 33 on the second substrate 3b side overlap each other in the conductive areas 31, and moreover, are electrically connected to each other through the connecting members 5 included in the sealing member 4.

As seen in the above description, the pixel electrodes 13 are connected to the liquid crystal driving IC 9a on the first substrate 3a via the TFD elements 16 and the line wirings 14. On the other hand, the opposed electrodes 28 formed on the second substrate 3b are connected to the liquid crystal driving ICs 9b on the first substrate 3a via the wirings 33 and the wirings 29b which are electrically connected through the connecting members 5 in the conductive areas 31, respectively.

Referring to FIG. 2, the liquid crystal display 1 of this embodiment is configured as described above. Thus, when an external light such as solar light or indoor light is sufficient, the external light is transmitted through the first substrate 3a and the liquid crystal layer L, reaches the transflective film 24, is reflected by the transflective film 24, and then, is supplied to the liquid crystal layer L. On the other hand, when the external light is insufficient, the light emitting source 6 of the lighting device 8 is turned on. The light from the light emitting source 6 in a dot or line pattern is converted by a light-guide 7 to a plane light and supplied to the liquid crystal panel 2. The light supplied to the liquid crystal panel 2 is transmitted through the transflective film 24 and supplied to the liquid crystal layer L.

When light is supplied to the liquid crystal layer L as described above, the liquid crystal driving IC 9a shown in FIG. 1 is operated, so that one of a scanning signal and a data signal is supplied to the line wirings 14. Moreover, the liquid crystal driving ICs 9b are operated, so that the other of the scanning signal and the data signal is supplied to the opposed electrodes 28. Thereby, the alignment of a plurality of the pixels constituting the display area V is controlled for each pixel. The light transmitted through the liquid crystal is modulated for each pixel. Thus, the light modulated as described above is selectively transmitted through the polarizer 19a shown in FIG. 2, whereby characters, figures, and so forth are externally displayed.

In the liquid crystal display 1 of this embodiment, as shown in FIG. 1, first dummy patterns 34 are provided in the partial area of the parts of the sealing member 4 which are opposed to the two conductive areas 31, respectively, and sandwich the display area V. In this embodiment, the first dummy pattern 34 comprises a plurality of linear first dummy pattern elements 34a and a plurality of linear first dummy pattern elements 34b. The first dummy pattern elements 34a are formed on the surface of the first substrate 3a so as to run through the parts of the sealing member 4 which are opposite to the conductive areas 31, respectively, as shown in FIG. 4. The first dummy pattern elements 34b are formed on the surface of the second substrate 3b so as to run through the parts of the sealing member 4 which are opposite to the conductive areas 31, respectively, as shown in FIG. 5. These dummy patterns 34a and 34b are opposed to each other sandwiching the sealing member 4 between them as shown in FIG. 20.

The first dummy pattern elements 34a provided on the first substrate 3a may be formed with the same material as used in the process of forming the wirings 29b on the first substrate 3a, e.g., Ta, Cr, ITO, and so forth, simultaneously when the process is carried out, so as to have the same thickness that the wirings 29b. Moreover, the first dummy pattern elements 34b provided on the second substrate 3b may be formed with the same material as used in the process of forming the opposed electrodes 28 and the wirings 33 on the substrate 3b, e.g., ITO or the like, simultaneously when the process is carried out, so as to have the same thickness of the wirings 33.

The dummy pattern elements 34b may be connected to the opposed electrodes 28 or may be formed by prolonging the opposed electrodes 28. In the case in which the first dummy pattern elements 34b are electrically connected to the opposed electrodes 28, the following advantages can be obtained.

That is, if both of the dummy patterns formed on the substrates 3a and 3b are electrically separated, respectively, a capacitor is formed between them. Inconveniently, electric charges which are stored in the capacitor can not be easily removed. On the other hand, when one of the dummy patterns is electrically connected to an electrode or a wiring, the electric charges can be conveniently removed.

In this embodiment, one of the first dummy pattern elements 34a and one of the first dummy pattern elements 34b positionally overlap each other, sandwiching the sealing member 4 between them, resulting in formation of one unit. A plurality of the units are arranged at appropriate intervals to form the first dummy pattern 34.

Referring to FIG. 4, the first dummy pattern elements 34a on the first substrate 3a side are formed so as to be positioned correspondingly to a plurality of the wirings 29b present in the conductive areas 31, respectively. Moreover, the line width of each of the first dummy pattern elements 34a is set to be substantially equal to that of the corresponding wiring 29b.

Referring to FIG. 5, the first dummy pattern elements 34b on the second substrate 3b side are formed so as to be positioned correspondingly to a plurality of the wirings 33 present in the conductive areas 31, respectively. Moreover, the line width of each of the first dummy pattern elements 34b is set to be substantially equal to that of the corresponding wiring 33.

In FIG. 1, it is depicted that the first dummy pattern elements 34a on the first substrate 3a side and the first dummy pattern elements 34b on the second substrate 3b side are positioned so as to be slightly shifted from each other. This is carried out to facilitate understanding of the structure as a matter of convenience. In practice, when the first substrate 3a and the second substrate 3b are bonded to each other, the first dummy pattern elements 34a and the first dummy pattern elements 34b overlap each other so as to form substantially one line as viewed in the direction perpendicular to these substrates.

Thus, the dimension for each of the first dummy patterns 34 comprising the first dummy pattern elements 34a on the first substrate 3a side and the first dummy pattern elements 34b on the second substrate 3b side to run through the sealing member 4 is substantially equal to the total dimension for the wirings 29b on the first substrate 3a side and the wirings 33 on the second substrate 3b side to run through the sealing member 4 in the conductive area 31 opposite to the aforementioned first dummy pattern 34.

To achieve electrical connection in each of the conductive areas 31, the wirings 29b on the first substrate 3a side and the wirings 33 on the second substrate 3b need to run through the sealing member 4. In this case, if no countermeasures are taken for the area of the sealing member 4 opposite to the conductive area 31, the size of the gap between the substrates, that is, the cell gap may become uneven. Thus, probably, the alignment control of the liquid crystal can not be uniformly carried out on the whole surface of the display area V. With respect to this, according to this embodiment, the first dummy pattern 34 is provided in the areas of the sealing member 4 which are opposite to the conductive areas 31, respectively. Therefore, the interval between the substrates, that is, the cell gap can be kept uniform all over the liquid crystal panel. Thereby, the liquid crystal display qualities can be kept on a high level.

Moreover, the dimensions for the first dummy pattern 34 to run through the sealing member 4 are set to be substantially the same as the total of the dimensions for the wirings 29b on the first substrate 3a side and the wirings 33 on the second substrate 3b side to run through the sealing member 4, respectively. Therefore, the cell gap can be kept more uniform.

Referring to FIG. 4, the first dummy pattern elements 34a on the first substrate 3a side are arranged so as to correspond to a plurality of the wirings 29b present in the conductive areas 31, respectively. Moreover, in FIG. 5, the first dummy pattern elements 34b on the second substrate 3b side are arranged so as to correspond to a plurality of wirings 33 present in the conductive areas 31, respectively. According to this configuration, the conditions about the dimensions on the first dummy pattern elements 34 side with respect to the sealing member 4 become the same as those of the dimensions on the wirings 29b and 33 side with respect to the sealing member 4. Therefore, the cell gap of the liquid crystal panel can be kept even more uniform.

In FIG. 4, the wirings 29a extended from the line wirings 14 run through one side 4e of the sides of the sealing member 4. Moreover, the parts of the ends of the line wirings 14 which are opposite to the wirings 29a and run through the one side 4d of the sealing member 4 opposite to the one side 4e function as a dummy pattern 38. The dummy pattern 38 acts in such a manner that the thickness between the substrates in the area of the side 4e of the sealing member 4 in which the wirings 29a run through the sealing member 4e, that is, the cell gap is kept equal to the cell gap in the side 4d of the sealing member 4. Thus, the cell gap of the liquid crystal panel in the longitudinal direction in FIG. 4, that is, taken along the line wirings 14 in FIG. 4 can be kept constant.

As shown in FIG. 2, another dummy pattern 63 is formed on the surface of the second substrate 3b in a position opposed to the dummy pattern 38 so as to overlap the dummy pattern 38. Moreover, still another dummy pattern 64 is formed on the surface of the second substrate 3b in a position which is opposite to the dummy pattern 38 and is opposed to the area of the side 4e of the sealing member 4 through which the wirings 29a run.

The dummy pattern 63 is formed as shown in FIG. 5 so as to have the same shape as the area of the sealing member 4 through which the dummy pattern 38 shown in FIG. 4 run. Moreover, the dummy pattern 64 is formed as shown in FIG. 5 so as to have the same shape as the area of the sealing member 4 through which the wirings 29a shown in FIG. 4 run. Furthermore, as shown in FIG. 2, the dummy pattern 38 and the dummy pattern 63 come into contact with the lower end and the upper end of the connecting member 5. Moreover, on the opposite side sandwiching the liquid crystal layer L, the wirings 29a and the dummy pattern 64 come into contact with the upper end and the lower end of the connecting member 5, respectively. Furthermore, as shown in FIG. 5, the dummy pattern 63 and the dummy pattern 64 are electrically independent of each other, not electrically connected to the opposed electrodes 28. The cell gap can be kept more constant by providing these dummy patterns 63 and 64.

In this embodiment, as shown in FIG. 4, the wirings 29b formed on the surface of the first substrate 3a run through the sealing member 4 in the second areas 32 excluding the conductive areas 31 and extend into the substrate-protruding portion 3c, that is, the wiring-lead-out area. In this case, if no countermeasures are taken in the areas of the sealing member 4 opposite to the second areas 32, the size of the gap between the substrates, that is, the cell gap may become uneven. Thus, probably, the alignment control for the liquid crystal can not be carried out uniformly all over the display area V. With respect t this, according to this embodiment, second dummy patterns 37 are provided in the areas of the sealing member 4 opposite to the second areas 32, respectively. Thereby, the gap between the substrates, that is, the cell gap can be kept uniform all over the liquid crystal panel. Thus, the liquid crystal display qualities can be kept on a high level.

In this embodiment, each of the second dummy patterns 37 comprises linear patterns 39 which are formed in positions corresponding to the respective wirings 29b present in the second area 32. The total dimension for the respective patterns 39 to run through the sealing member 4 is substantially equal to the total dimension for the wirings 29b to run through the sealing member 4 in the second area 32. Thereby, the interval between the substrates, namely, the cell gap can be kept constant all over the liquid crystal panel. Thus, the liquid crystal display qualities can be maintained on a high level.

Moreover, in this embodiment, dummy patterns 66 are formed on the second substrate 3b shown in FIG. 5, which is opposed to the first substrate 3a having the wirings 29a shown in FIG. 4 formed thereon, opposite to the positions of the sealing member 4 through which the wirings 29b shown in FIG. 4 run. Moreover, dummy patterns 67 are formed on the surface of the second substrate 3b shown in FIG. 5 in positions opposed to the dummy patterns 39 shown in FIG. 4. Thus, the cell gap along the extension direction of the line wirings 14 can be kept more constant by providing the dummy patterns 66 and 67 on the second substrate 3b opposed to the first substrate 3a having the wirings 29b formed thereon.

Modification

In the embodiment shown in FIG. 1, the second dummy patterns 37 are provided corresponding to the second areas 32 through which the wirings 29b run. The wirings 29b also run through the conductive areas 31. The dummy patterns are not necessarily provided in the positions corresponding to the second areas 32.

Moreover, in the embodiment of FIG. 1, the first dummy patterns 34 are provided on both of the first substrate 3a and the second substrate 3b. However, the first dummy patterns 34 may be formed on either the first substrate 3a or the second substrate 3b, if necessary.

Furthermore, in the embodiment of FIG. 1, each of the first dummy patterns 34 is formed in a pattern comprising a plurality of the straight lines. The first dummy pattern 34 may be formed in one solid pattern with an appropriate dimension instead of the above-mentioned pattern.

(Second Embodiment of the Liquid Crystal Device)

Figure 6:
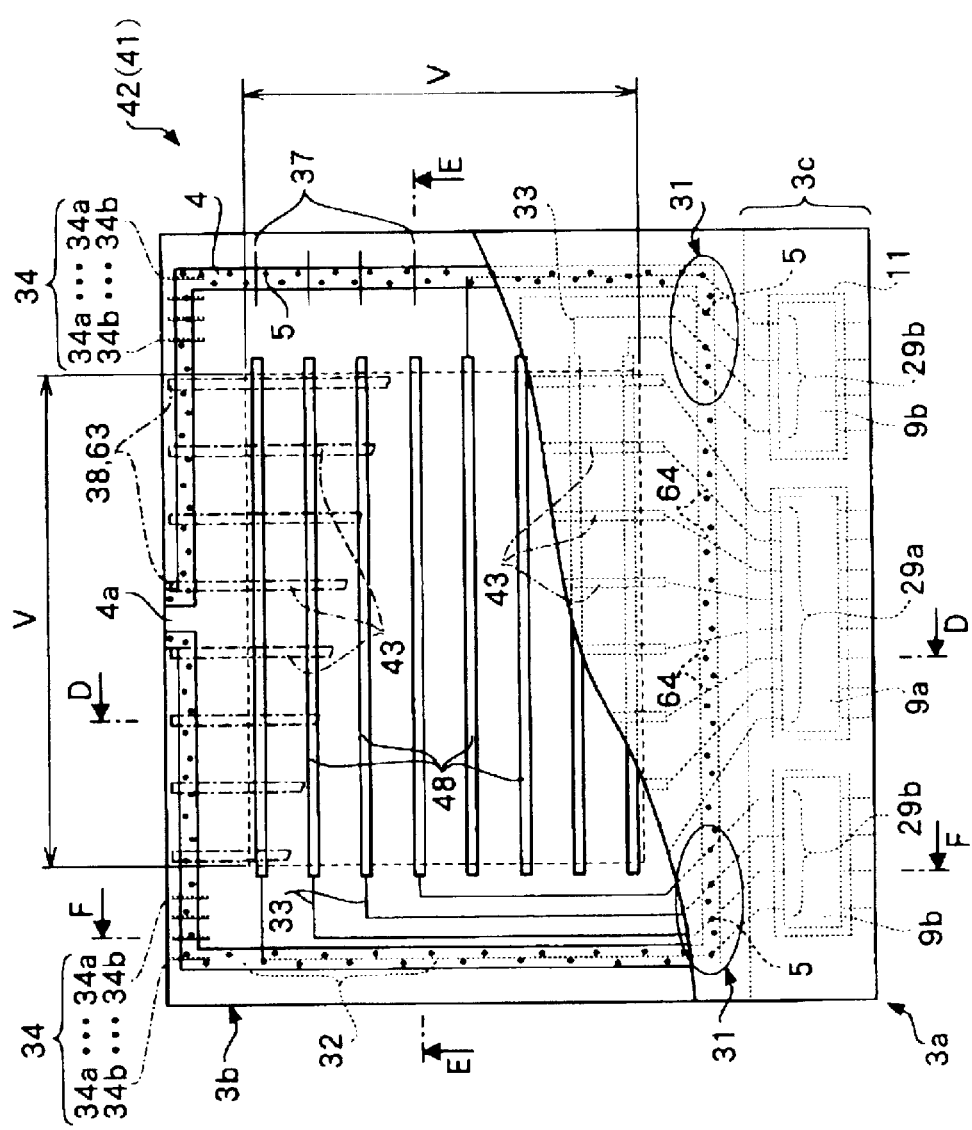
FIG. 6 is a partially cut-out plan view of a liquid crystal device according to another embodiment of the present invention.

FIG. 6 shows an embodiment of a simple matrix type liquid crystal device having a structure not employing an active element, that is, a liquid crystal device having a structure in which IC chips are mounted directly to a substrate, namely, having a COG (Chip On Glass) system, to which the present invention is applied.

A liquid crystal device 41 has a structure in which a lighting unit, a control substrate, and other accessories are provided on a liquid crystal panel 42 of which the plan-structure is shown in FIG. 6. The liquid crystal panel 42 is formed by joining, that is, bonding the first substrate 3a arranged as seen on the front side of FIG. 6 and the second substrate 3b positioned as seen behind FIG. 6 to each other with the circular sealing member 4. Conductive members 5 for electrically connecting the first substrate 3a and the second substrate 3b to each other are dispersed in their dispersed state inside the sealing member 4.

The region surrounded by the sealing member 4, the first substrate 3a, and the second substrate 3b is a gap having a constant height which constitutes a so-called cell gap. Moreover, the liquid crystal injecting port 4a is formed in a part of the sealing member 4. A liquid crystal is injected into the cell gap through the liquid crystal injecting port 4a. After completion of the injection, the liquid crystal injecting port 4a is sealed with a resin or the like.

Figure 7:
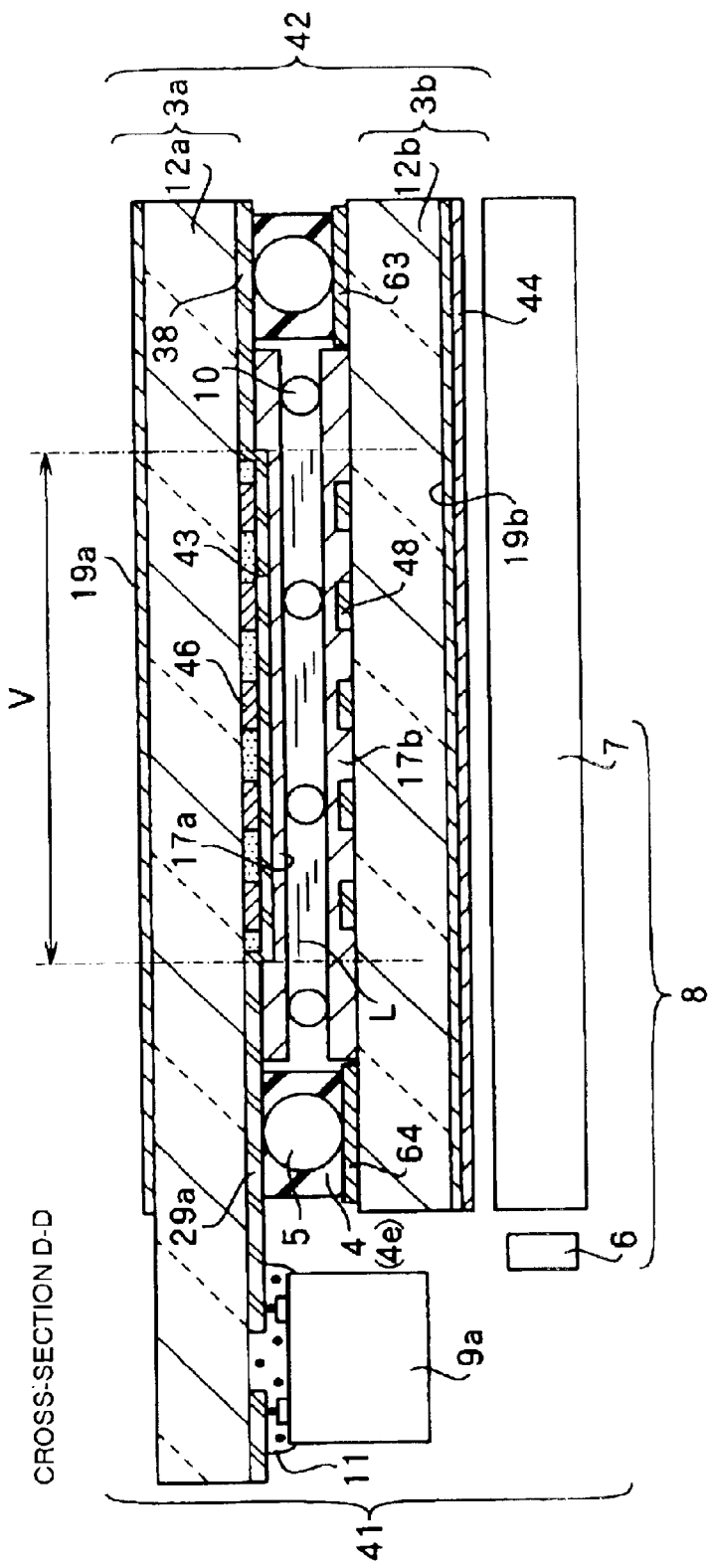
FIG. 7 is a cross-sectional view showing the cross-sectional structure of the liquid crystal device taken along line D—D in FIG. 6.

FIG. 7 is a cross-sectional view of the liquid crystal display 41 taken along line D—D in FIG. 6. As shown in FIG. 7, a lighting device 8 including the light-emitting source 6 and the light-guide 7 is provided as a back light on the back side of the second substrate 3b of the liquid crystal panel 42 (on the lower side in the structure shown in FIG. 7).

In FIG. 6, the first substrate 3a includes a substrate-protruding portion 3c which protrudes outward of the second substrate 3b and is used as a wiring-lead-out region. ICs 9a and 9b for driving liquid crystals are mounted onto the substrate-protruding portion 3c by using a conductive adhesion element, e.g., ACF (Anisotropic Conductive Film) 11. The liquid crystal driving IC 9a and the liquid crystal driving IC 9b have different characteristics. As mentioned above, the two types of the liquid crystal driving ICs are used, because voltages for use on the first substrate 3a side and on the second substrate 3b side, in other words, the voltages for use in a scanning line driving system and a signal line driving system are different from each other, and only one type of IC chip can not satisfy the different voltage conditions.

Referring to FIG. 7, the first substrate 3a includes the base member 12a. A color filter film 46 is formed on the inner surface of the base member 12a, that is, on the surface on the liquid crystal layer L side thereof. First electrodes 43 are formed on the color filter film 46. Moreover, the alignment film 17a is formed thereon. As shown in FIG. 6, the first electrodes 43 are formed in parallel to each other, and as a whole, in a stripe pattern. A polarizer 19a is formed on the outer surface of the base member 12a.

As shown in FIG. 7, the second substrate 3b comprises the base member 12b. Second electrodes 48 are formed on the inner surface of the base member 12b, that is, on the surface thereof on the liquid crystal layer L side. An alignment film 17b is formed on the outside surface of the base member 12b. A polarizer 19b is formed thereon. A transflective film 44 is formed thereon.

Regarding the second electrodes 48, a number of the linear electrodes 48 are arranged parallel to each other so as to intersect the first electrodes 43, as shown in FIG. 6. That is, as a whole, the second electrodes 48 are formed in a stripe pattern. It should be noted that in FIG. 6, only several first electrodes 43 and only several second electrodes 48 are schematically depicted at relatively large intervals to facilitate understanding, but in practice, a number of the first electrodes 43 and a number of the second electrodes 48 are formed at very short intervals.

In FIG. 6, the intersecting points of the first electrodes 43 and the second electrodes 48 are arrayed in a dot matrix pattern. Each of these intersecting points constitutes one dot.

Each of the color patterns of the color filter film 46 shown in FIG. 7 corresponds to the one dot. In the color filter film 46, for example, one unit comprising three primary colors, that is, R (red), G (green), and B (blue) constitutes one pixel. A rectangular area V which is sectioned by a plurality of dots arranged in a dot matrix pattern is a drive area driven by voltage application, namely, a display area in which an image such as characters is displayed.

The base members 12a and 12b are made of glass, plastics, or the like. The transflective film 44 is made of a material with a light reflecting property such as Al (aluminum). To achieve the functions of transflection and reflection, the light-reflecting material is formed in such a manner as to have a small thickness that allows a light to be transmitted, or openings for transmitting a light are formed in the transflective film 24 in place at an appropriate area ratio.

The color filter film 46 is formed by applying pigments in an appropriate pattern such as a mosaic array, a stripe array, a delta array, or the like by a well-known color picture element formation method such as an inkjet method, a color dispersion method, or the like.

The first electrodes 43 and the second electrodes 48 are formed by a well-known film-forming method for ITO (Indium Tin Oxide) such as sputtering, vacuum deposition, or the like. Moreover, the film is processed by photo-etching into a desired pattern. The alignment films 17a and 17b are formed e.g., by a method of applying a polyimide solution and then firing, an offset printing method, or the like.

Figure 8:
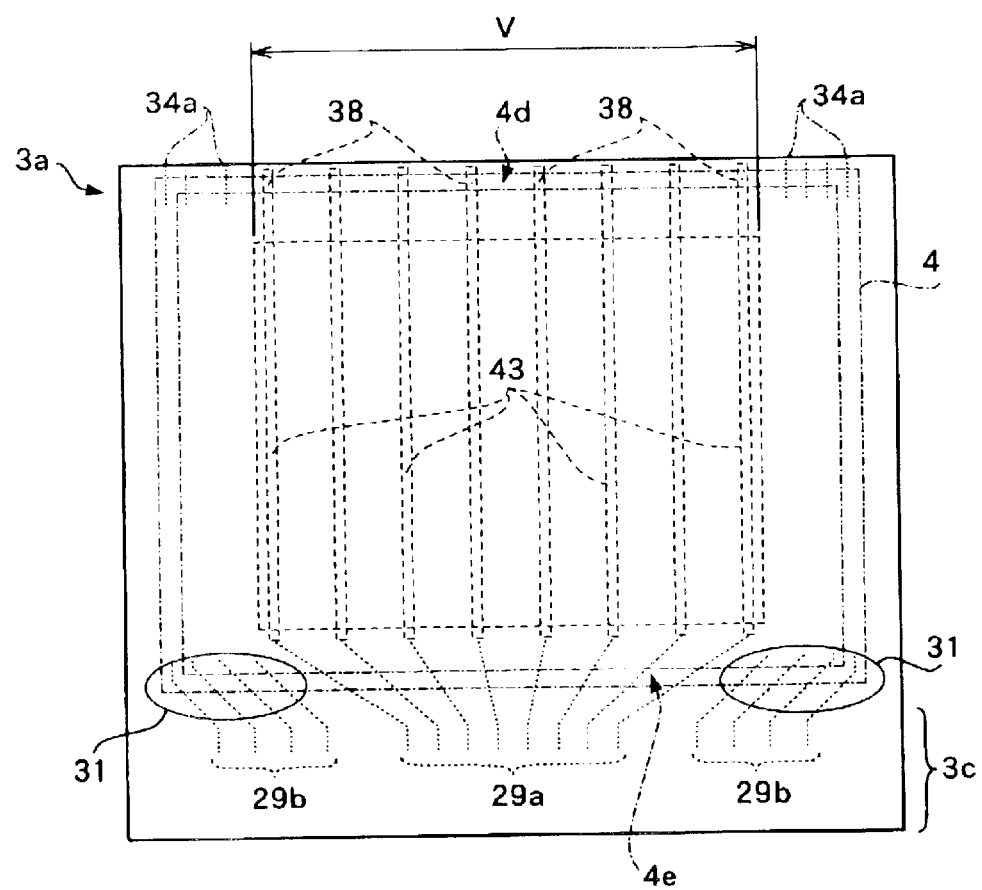
FIG. 8 is a plan view of one of the substrates constituting the liquid crystal device of FIG. 6.

Referring to FIG. 8, wirings 29a are formed on the liquid crystal side surface (that is, on the backside surface in FIG. 8) of the first substrate 3a so as to run in the direction from the first electrodes 43 toward the substrate-protruding portion 3c. Moreover, the conductive areas 31 are formed in both of the ends of the sealing-member side 4e, which run in parallel to the protruding portion 3c of the first substrate 3a. The wirings 29b are formed between the conductive areas 31 and the IC mounting areas of the substrate-protruding portion 3c, respectively.

Figure 9:
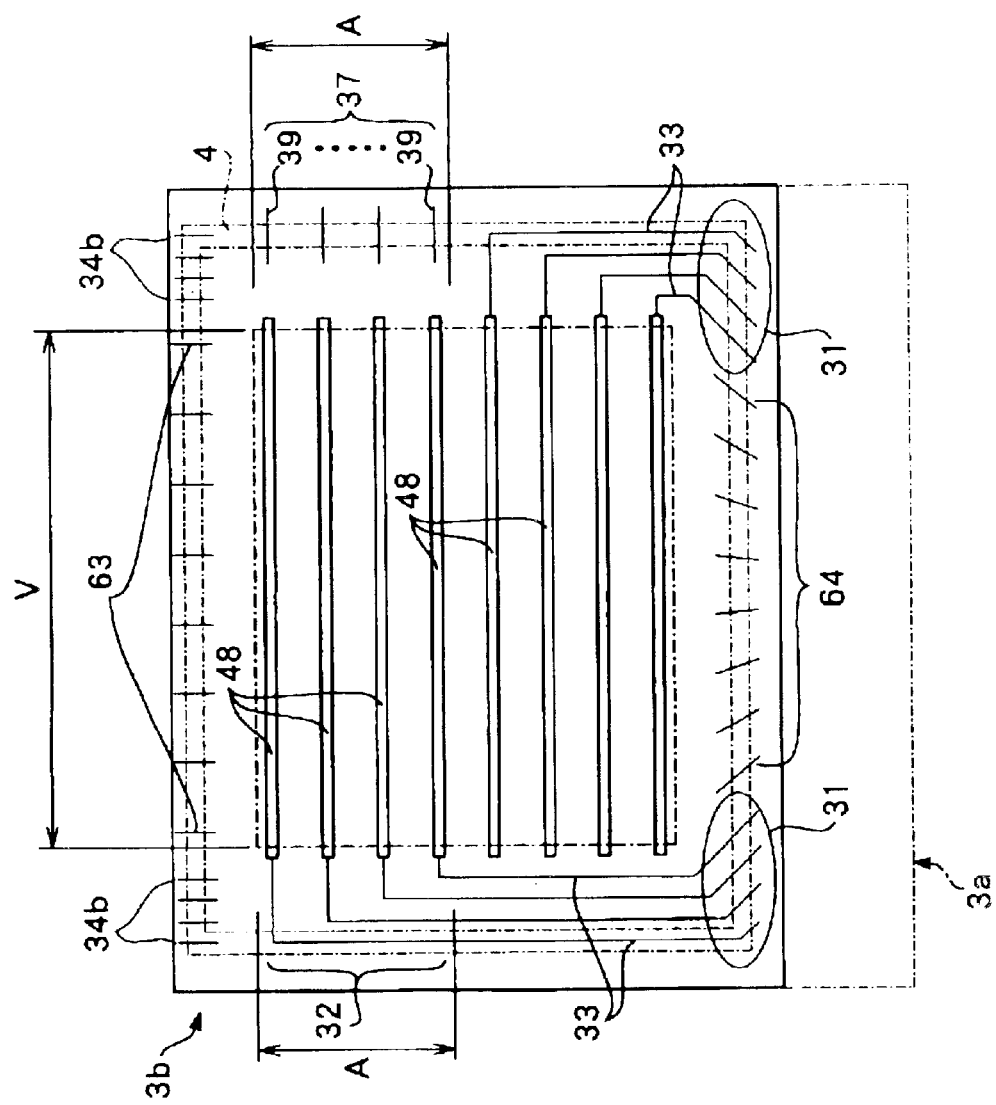
FIG. 9 is a plan view of the other substrate constituting the liquid crystal device of FIG. 6.

Referring to FIG. 9, the wirings 33 are formed on the surface on the liquid crystal side (that is, the surface on the front side of FIG. 9) of the second substrate 3b to run between the ends of second electrodes 48 and the conductive areas 31, that is, between the display area V and the conductive areas 31, respectively.

Figure 22:
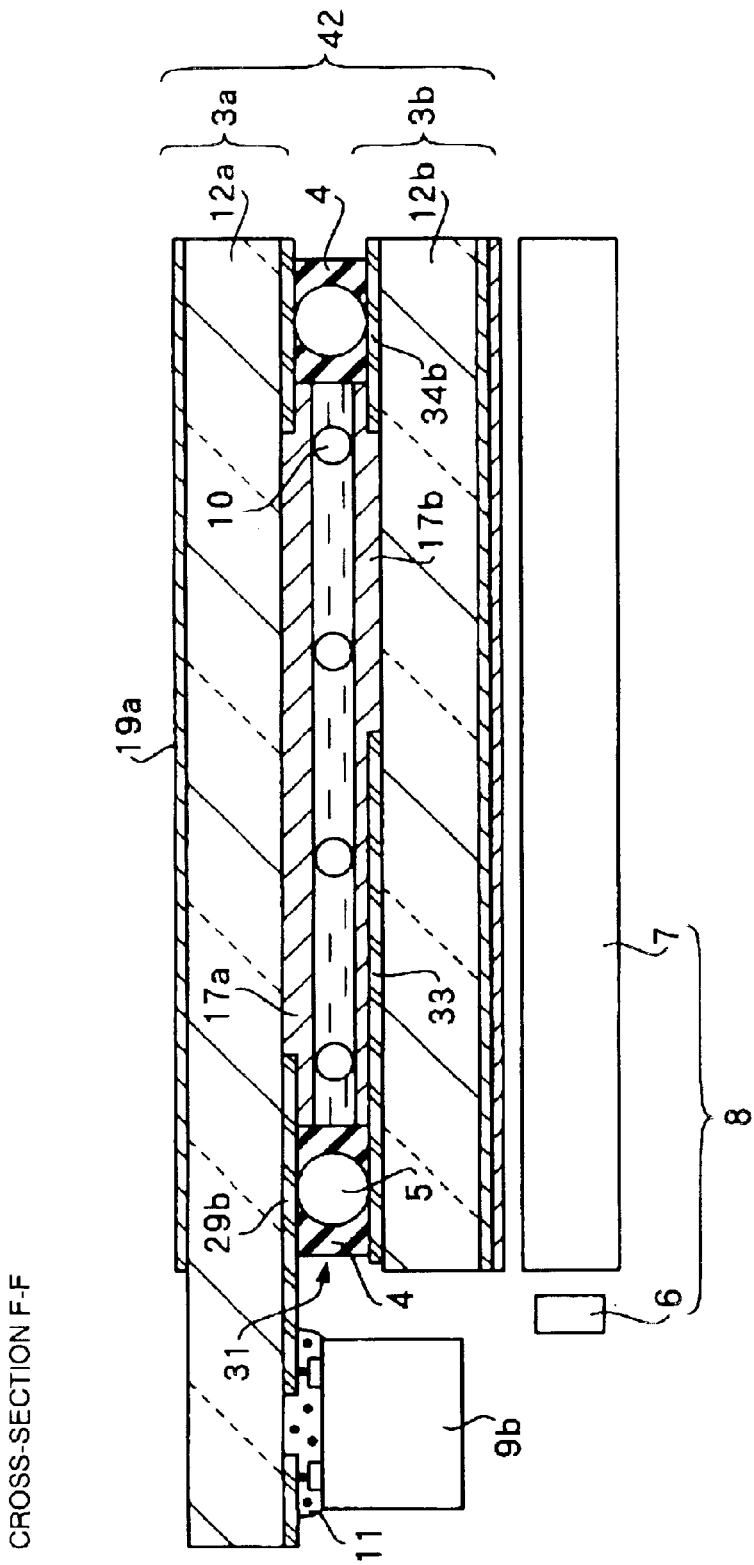
FIG. 22 is a cross-sectional view taken along line F—F in FIG. 6.

The sealing member 4 is formed in a circular pattern on the liquid crystal side surface of either the first substrate 3a shown in FIG. 8 or the second substrate 3b shown in FIG. 9 by printing or the like. The first substrates 3a and 3b are bonded to each other with the sealing member 4 being sandwiched between them. Thus, a liquid crystal panel 42 shown in FIG. 6 is formed. In this case, as shown in FIG. 22, the wirings 29b on the first substrate 3a side and the wirings 33 on the second substrate 3b side overlap each other, and moreover, are electrically connected to each other with the connecting members 5 included in the sealing member 4.

Thus, in FIG. 6, the first electrodes 43 are connected to the liquid crystal driving IC 9a on the first substrate 3a via the wirings 29a. On the other hand, the second electrodes 48 formed on the second substrate 3b are connected to the liquid crystal driving ICs 9b on the first substrate 3a via the wirings 33 and the wirings 29b electrically connected through the connecting members 5 in the conductive areas 31, respectively.

Referring to FIG. 7, the liquid crystal display 41 of this embodiment is configured as described above. Thus, when an external light such as solar light or indoor light is sufficient, the external light is transmitted through the first substrate 3a and the liquid crystal layer L, reaches the transflective film 44, is reflected by the transflective film 44, and then, is supplied to the liquid crystal layer L. On the other hand, when the external light is insufficient, the light emitting source 6 of the lighting device 8 is turned on. The light emitted from the light emitting source 6 in a dot or line pattern is converted by means of a light-guide 7 to a plane light and supplied to the liquid crystal panel 42. The light supplied to the liquid crystal panel 42 is transmitted through the transflective film 44 and supplied to the liquid crystal layer L.

When light is supplied to the liquid crystal layer L as described above, the liquid crystal driving IC 9a as shown in FIG. 6 is operated, so that one of a scanning signal and a data signal is supplied to the first electrodes 43. Moreover, the liquid crystal driving ICs 9b are operated, so that the other of the scanning signal and the data signal is supplied to the second electrodes 48. Thereby, the alignment of a plurality of the pixels constituting the display area V is controlled for each pixel. The light transmitted through the liquid crystal is modulated for each pixel. Thus, the light modulated as described above is selectively transmitted through the polarizer 19a shown in FIG. 7, whereby characters, figures, and so forth are externally displayed.

In the liquid crystal display 41 of this embodiment, as shown in FIG. 6, the first dummy pattern 34 is provided in parts of the area of the sealing member 4 which are opposite to the two conductive areas 31, respectively. In this embodiment, the first dummy pattern 34 comprises a plurality of linear first dummy pattern elements 34a each having a straight-line shape and a plurality of linear first dummy pattern elements 34b. The first dummy pattern elements 34a are formed on the surface of the first substrate 3a so as to run through the parts of the sealing member 4 which are opposite to the conductive areas 31, respectively, as shown in FIG. 8. The first dummy pattern elements 34b are formed on the surface of the second substrate 3b so as to run through the parts of the sealing member 4 which are opposite to the conductive areas 31, respectively, as shown in FIG. 9.

Referring to FIG. 8, the first dummy pattern elements 34a on the first substrate 3a side may be formed with the same material as used in the process of forming the wirings 29b on the first substrate 3a, e.g., ITO or the like, simultaneously when the process is carried out, so as to have the same thickness as that of the wirings 29b. Moreover, the first dummy pattern elements 34b on the second substrate 3b side shown in FIG. 9 may be formed with the same material as used in the process of forming the wirings 33 on the substrate 3b, e.g., ITO or the like, simultaneously when the process is carried out, so as to have the same thickness as that of the wirings 33.

In this embodiment, as shown in FIG. 22, the position of each first dummy pattern element 34a and that of each first dummy pattern element 34b overlap each other with the sealing member 4 being sandwiched between them, resulting in formation of one unit. A plurality of the units are arranged at appropriate intervals to form the first dummy pattern 34, as shown in FIG. 6.

Referring to FIG. 8, the first dummy pattern elements 34a on the first substrate 3a side are formed in the positions corresponding to the respective wirings 29b present in the conductive areas 31. Moreover, the line width of the respective first dummy pattern elements 34a is set to be substantially equal to that of the corresponding wirings 29b.

Referring to FIG. 9, the first dummy pattern elements 34b on the second substrate 3b side are formed in the positions corresponding to the wirings 33 present in the conductive areas 31, respectively. Moreover, the line width of the respective first dummy pattern elements 34b is set to be substantially equal to that of the corresponding wirings 33.

In FIG. 6, it is depicted that the first dummy pattern elements 34a on the first substrate 3a side and the first dummy pattern elements 34b on the second substrate 3b side are positioned so as to be slightly shifted from each other. This depiction is made to facilitate understanding of the structure for convenience. In practice, when the first substrate 3a and the second substrate 3b are bonded to each other, the first dummy pattern elements 34a and the first dummy pattern elements 34b overlap each other so as to form substantially one line as viewed in the direction perpendicular to these substrates, respectively.

Thus, the dimension for each of the first dummy patterns 34 comprising the first dummy pattern elements 34a on the first substrate 3a side and the first dummy pattern elements 34b on the second substrate 3b side to run through the sealing member 4 is substantially equal to the total dimension for the wirings 29b on the first substrate 3a side and the wirings 33 on the second substrate 3b side to run through the sealing member 4 in the conductive area 31 opposite to the aforementioned first dummy pattern 34.

To achieve electrical connecting in each conductive area 31, the wirings 29b on the first substrate 3a side and the wirings 33 on the second substrate 3b side need to run through the sealing member 4. In this case, if no countermeasures are taken for the area of the sealing member 4 opposite to the conductive areas 31, the size of the gap between the substrates, that is, the cell gap may become uneven. Thus, probably, the alignment control of the liquid crystal can not be uniformly carried out on the whole surface of the display area V. With respect to this, according to this embodiment, the first dummy pattern 34 is provided in the areas of the sealing member 4 which are opposite to the conductive areas 31, respectively. Therefore, the interval between the substrates, that is, the cell gap can be kept uniform all over the liquid crystal panel. Thereby, the liquid crystal display qualities can be kept on a high level.

Moreover, each of the dimensions for the first dummy pattern 34 to run through the sealing member 4 is set to be substantially equal to the total dimension for the wirings 29b on the first substrate 3a side and the wirings 33 on the second substrate 3b to run through the sealing member 4. Therefore, the cell gap can be kept more uniform.

Referring to FIG. 8, the first dummy pattern elements 34a on the first substrate 3a side are arranged corresponding to a plurality of the wirings 29b present in the conductive areas 31, respectively. Moreover, in FIG. 9, the first dummy pattern elements 34b on the second substrate 3b side are arranged correspondingly to a plurality of the wirings 33 present in the conductive areas 31, respectively. According to this configuration, the conditions dictating the dimensions on the first dummy pattern elements 34 side with respect to the sealing member 4 become the same as those about the dimensions on the wirings 29b and 33 side with respect to the sealing member 4, respectively. Therefore, the cell gap of the liquid crystal panel can be kept still more uniform.

Referring to FIG. 8, the wirings 29a extended from the first electrodes 43 run through one 4e of the sides of the sealing member 4. Moreover, the parts of the ends of the first electrodes 43 which are opposite to the wirings 29a and run through the one side 4d of the sealing member 4 opposite to the one side 4e function as the dummy pattern 38. The dummy pattern 38 acts in such a manner that the thickness between the substrates in the side 4e of the sealing member 4 which the wirings 29a run through, that is, the cell gap is kept equal to that in the side 4d of the sealing member 4. Thus, the action of the dummy pattern 38 enables the cell gap of the liquid crystal panel in the longitudinal direction in FIG. 8, that is, taken along the first electrodes 43 in FIG. 8 to be kept constant.

As shown in FIG. 7, another dummy pattern 63 is formed on the surface of the second substrate 3b in a position opposed to the dummy pattern 38 so as to overlap the dummy pattern 38. Moreover, still another dummy pattern 64 is formed on the surface of the second substrate 3b in a position which is opposite to the dummy pattern 38 and is opposed to the area of the side 4e of the sealing member 4 through which the wirings 29a run. The dummy pattern 63 is formed as shown in FIG. 9 so as to have the same shape as the area of the sealing member 4 through which the dummy pattern 38 shown in FIG. 8 run. Moreover, the dummy pattern 64 is formed as shown in FIG. 9 so as to have the same shape as the area of the sealing member 4 through which the wirings 29a in FIG. 8 run.

Furthermore, as shown in FIG. 7, the dummy pattern 38 and the dummy pattern 63 come into contact with the lower end and the upper end of the connecting member 5, respectively. Moreover, on the opposite side of the liquid crystal layer L, the wirings 29a and the dummy pattern 64 come into contact with the upper end and the lower end of the connecting member 5, respectively. Furthermore, as shown in FIG. 9, the dummy pattern 63 and the dummy pattern 64 are electrically independent of each other, not electrically connected to the second electrodes 48. The cell gap can be kept more constant by providing these dummy patterns 63 and 64.

In this embodiment, as shown in FIG. 9, the wirings 33 formed on the surface of the second substrate 3b run through the sealing member 4 in the second area 32 excluding the conductive areas 31. In this case, if no countermeasures are taken in the area A of the sealing member 4 opposite to the second area 32, the size of the gap between the substrates, that is, the cell gap may become uneven. Thus, probably, the alignment control for the liquid crystal can not be carried out uniformly all over the display area V. With respect to this, according to this embodiment, a second dummy pattern 37 is provided in the area A of the sealing member 4 opposite to the second area 32. Thereby, the gap between the substrates, that is, the cell gap can be kept uniform all over the liquid crystal panel. Thus, the liquid crystal display qualities can be kept on a high level.

Moreover, in this embodiment, the total dimension for a pattern 39 comprising a plurality of straight-lines and constituting the second dummy pattern 37 to run through the sealing member 4 is substantially equal to the dimension for the wirings 33 to run through the sealing member 4 in the second area 32 the length of which corresponds to that of the area A. Thereby, the interval between the substrates, that is, the cell gap can be kept constant all over the liquid crystal panel. Thereby, the liquid crystal display qualities can be kept on a high level.

The pattern 39 may be connected to the second electrodes 48 or may be formed by extending the second electrodes 48. The following advantages can be obtained by electrically connecting the pattern 39 to the second electrodes 48. More particularly, if both of the dummy patterns formed on the substrates 3a and 3b are electrically independent of each other, a capacitor is formed between them. Inconveniently, electric charges which are stored in the capacitor can not be easily removed. On the other hand, when one of the dummy patterns is electrically connected to an electrode or a wiring, the electric charges can be conveniently removed.

Figure 21:
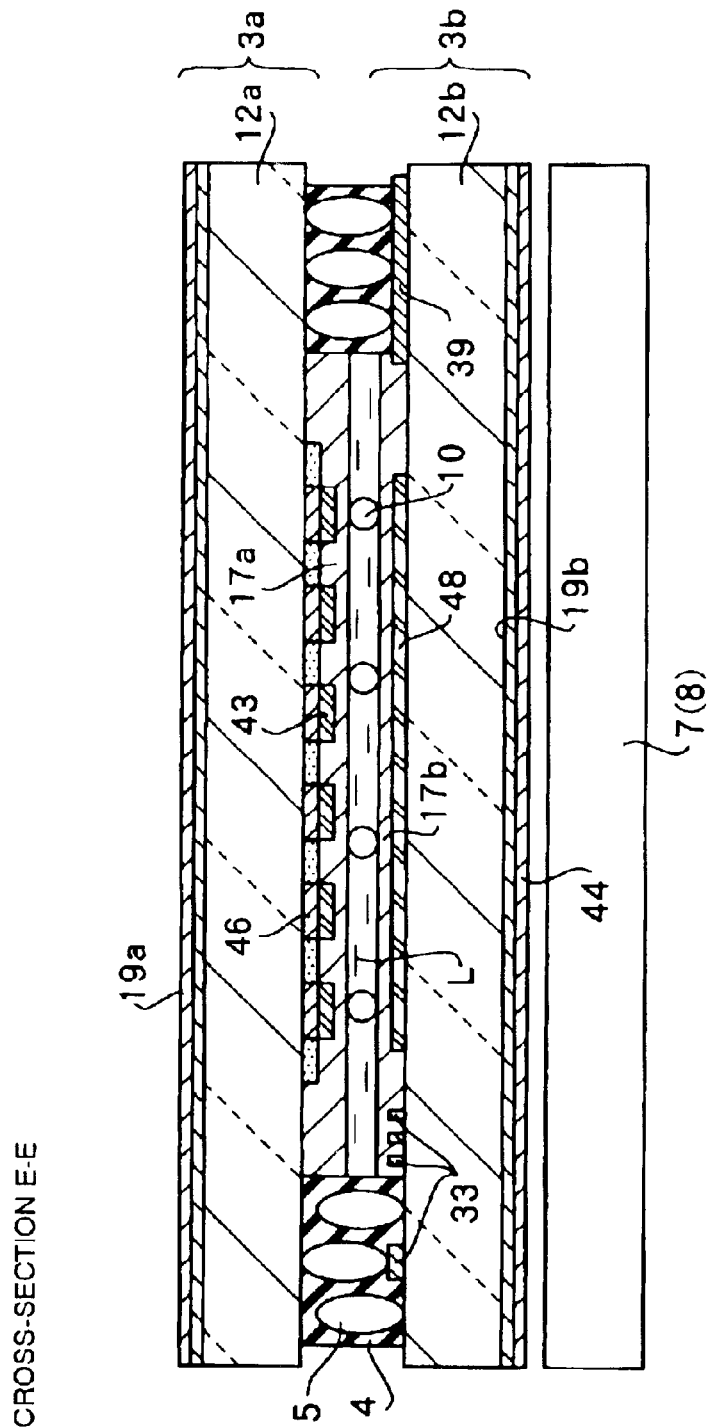
FIG. 21 is a cross-sectional view taken along line E—E in FIG. 6.

As shown in a cross-sectional view of FIG. 21 taken along line E—E in FIG. 6, the width of the cross-section of the sealing member 4 is set so as to include a plurality of conductive members 5. As shown in FIG. 21, a plurality of (three in the drawing) conductive members 5 are included in the cross-section. FIG. 21 depicts elliptical conductive members 5. This is made to facilitate understanding of the drawing. In practice, the conductive members 5 are formed to be spherical or cylindrical with the size being substantially the same as or slightly larger than that of the spacer 10.

As shown in FIG. 21, the length of the E—E cross-section of one dummy pattern 39 is larger than that of the E—E cross-section of the wirings 33 which are provided opposite to the dummy pattern 39 with respect to the liquid crystal layer L and are present in the inner area of the sealing member 4. The area A in FIG. 9 will be considered below. The total dimension of the pattern 39 in the area A is set to be equal to the total dimension of the wirings 33 in the area A. As a result, the number of the conductive members 5 placed on the pattern 39 in the area A can be set to be equal to that of the conductive members 5 placed on the wirings 33 in the area A. Thereby, the cell gap can be kept more constant.

(Modification)

In the embodiment shown in FIG. 6, the second dummy patterns 37 are provided corresponding to the second areas 32 through which the wirings 33 run. The wirings 33 also run through the conductive areas 31. The dummy patterns are not necessarily provided in the positions corresponding to the second areas 32.

Moreover, in the embodiment of FIG. 6, the first dummy patterns 34 are provided on both of the first substrate 3a and the second substrate 3b. However, the first dummy patterns 34 may be formed on only one of the first substrate 3a and the second substrate 3b, if necessary.

Furthermore, in the embodiment of FIG. 6, each of the first dummy patterns 34 is formed in a pattern comprising a plurality of the straight lines. The first dummy pattern 34 may be formed as one solid pattern with an appropriate dimension instead of the above-mentioned pattern.

(Third Embodiment of the Liquid Crystal Device)

Figure 15:
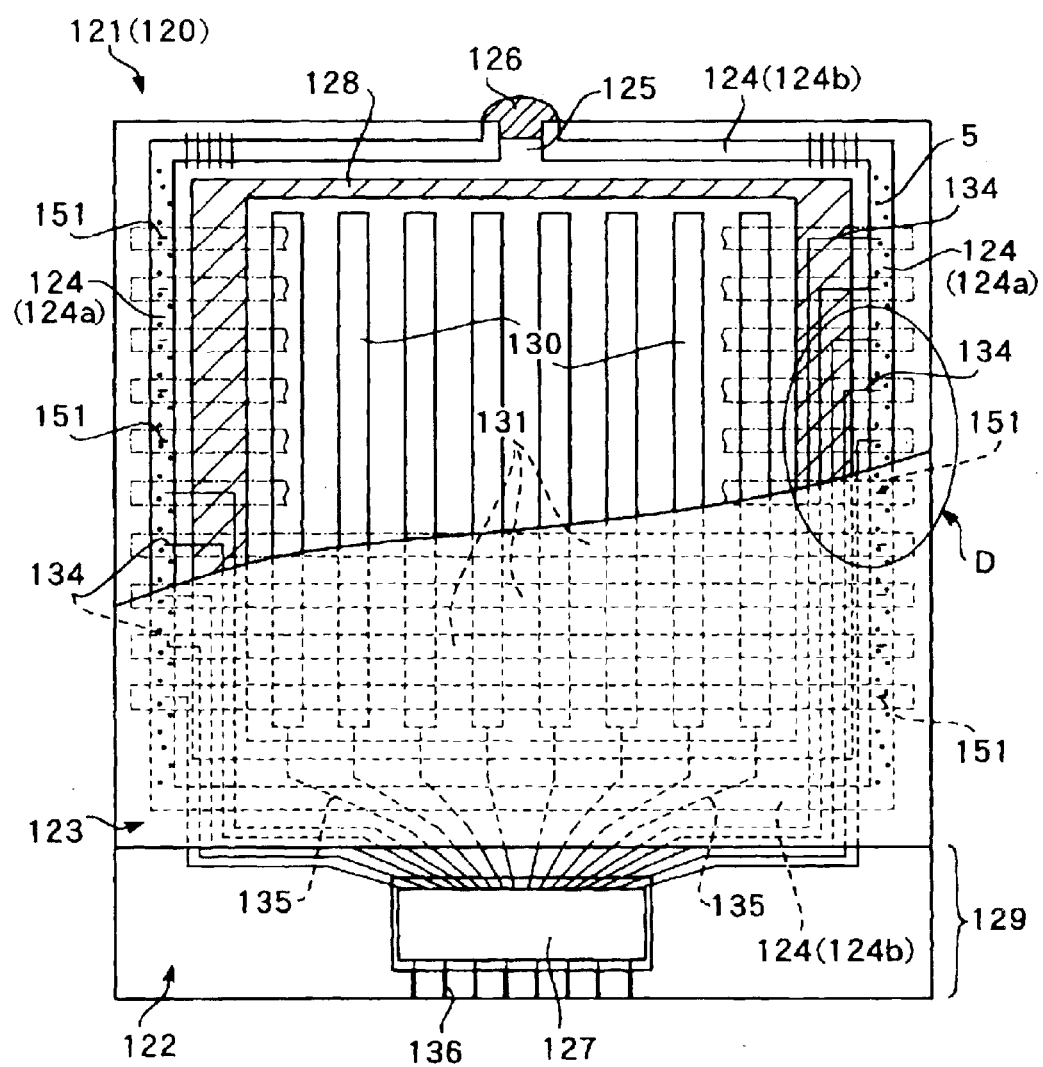
FIG. 15 is a partially cut-out plan view of a liquid crystal device according to still another embodiment of the present invention.

FIG. 15 shows an embodiment of a simple matrix system transflection type color liquid crystal device for which the present invention is applied. A liquid crystal device 120 shown there comprises a lighting device, a control substrate, and other accessories formed on the liquid crystal panel 121 the whole plan structure of which is shown in FIG. 15.

In a liquid crystal panel 121, a lower substrate 122 and an upper substrate 123 having a rectangular shape as viewed in the plan thereof, are arranged so as to be opposed to each other via a sealing member 124. An opening is formed in a part of the sealing member 124 on one-side side of the substrates 122 and 123 (on the upper-side side in FIG. 15) as a liquid crystal injection port 125. A liquid crystal is sealed into the space surrounded by both substrates 122 and 123 and the sealing member 124. Moreover, the liquid crystal injection port 125 is sealed with a sealing material 126. It should be noted that the conductive members 5 such as anisotropic electroconductive particles are incorporated into the part 124a of the rectangular circular sealing member 124 lying along the right and left sides of the substrates 122 and 123, and therefore, the part 124a of the sealing member 124 functions as a connecting portion as well as it acts for sealing of the liquid crystal. On the other hand, no conductive members 5 are included in the part 124b of the sealing member 124 lying along the upper and lower sides of the substrates 122 and 123. Thus, the part 124b functions as a non-conductive sealing member for sealing a liquid crystal.

In this embodiment, the outer size of the lower substrate 122 is larger than that of the upper substrate 123. The lower substrate 122 and the upper substrate 123 are arranged as follows. The edges on three sides (that is, the upper, right and left sides in FIG. 1) of the upper substrate 123 and those of the lower substrate 122, that is, the end faces of the substrates 123 and 122 are aligned with each other. The peripheral portion of the lower substrate 122 protrudes from the remaining one side (that is, the lower side in FIG. 1) of the upper substrate 123, whereby a protruded area 129 is formed. A driving semiconductor element 127 for driving the electrodes on both of the upper substrate 123 and the lower substrate 122 is mounted on the protruded area 129. Reference numeral 128 designates a rectangular circular light-shielding layer (that is, a break line for the periphery) for shielding light around the periphery of the effective display area. The area inside of the inner side of the light-shielding layer 128 is the effective display area which makes a contribution to the practical image display.

Figure 16:
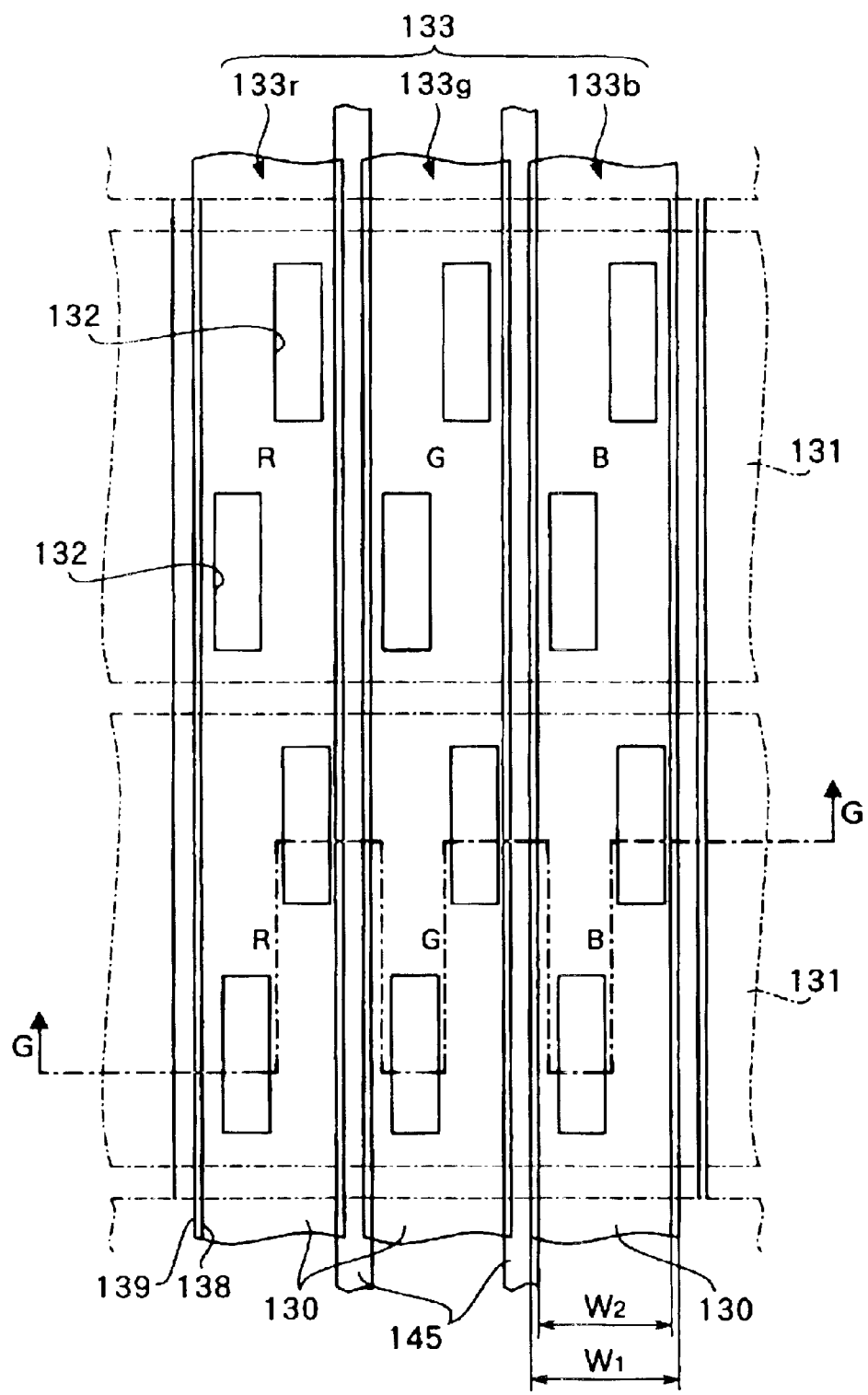
FIG. 16 shows the elementary parts of FIG. 15.

As shown in FIG. 16, a plurality of segment electrodes 130 are formed in a stripe pattern on the lower substrate 122. On the other hand, a plurality of common electrodes 131 are formed on the upper substrate 123 in a stripe pattern so as to extend in the lateral direction in the drawing, crossing the segment electrodes 130 at a right angle.

Referring to the respective coloring matter layers 133r, 133g, and 133b for R, G, and B of a color filter 133, coloring matter layers with the same colors are arranged in the extension direction of the segment electrodes 130, respectively. Rs, Gs, and Bs are alternately arranged perpendicularly to the extension direction. Three pixels of R, G, and B arranged in the lateral direction in FIG. 16 constitute one dot on a screen.

Each segment electrode 130 has a lamination structure comprising an APC film 138 having a width W2 and a transparent electrode film 139 having a width W1. The APC film 138 is made of an alloy containing silver, palladium, and copper at a predetermined ratio. Moreover, the transparent conductive film 139 is formed, e.g., by using an ITO film.

In this embodiment, the APC film 138 has two windows 132 for light-transmission as light-transmissive areas for each pixel. The windows 132 are arranged in a zigzag pattern as shown when the coloring matter layers 133r, 133g, and 133b of the color filter 133 are viewed in the longitudinal direction of a plurality of the pixels. The term "pixel" used here means an area in which a segment electrode 130 and a common electrode 131 overlaps each other as viewed in the plan thereof as shown in FIG. 16.

As shown in FIG. 15, both of the ends of the respective common electrodes 131 come into contact with and run through a conductive sealing member 124a, and lie outside of the conductive sealing member 124a. The right ends of the common electrodes 131 (five common electrodes are shown in FIG. 15) constituting the upper half of FIG. 15 out of a plurality of the common electrodes 131 (ten common electrodes 15 are shown in FIG. 15), are electrically connected to common electrode routed wirings 134 on the lower substrate 122 via the conductive members 5 such as anisotropic conductive particles incorporated in the conductive sealing member 124a. The routed wirings 14 on the lower substrate 122 extend from the conductive sealing member 124a toward the center of the substrate, are bent, are extended in the longitudinal direction along the right side of the lower substrate 122, run across a part of the non-conductive sealing member 124b, and are connected to output terminals (not shown) of the driving semiconductor element 127 mounted on the protruded area 129.

Similarly, the left ends of the common electrodes 131 (five common electrodes are shown in FIG. 15) constituting the upper half of FIG. 15 out of a plurality of the common electrodes 131 are electrically connected to routed wirings 134 on the lower substrate 122 via the conductive members 5 such as anisotropic conductive particles incorporated in the conductive sealing member 124a. The routed wirings 134 on the lower substrate 122 extend from the conductive sealing member 124a toward the center of the substrate, are bent, are extended in the longitudinal direction along the left side of the lower substrate 122, run across a part of the non-conductive sealing member 124b, and are connected to output terminals of the driving semiconductor element 127 mounted on the protruded area 129.

That is, all of the routed wirings 134 are disposed in the area which is inside the conductive sealing member 124a and is outside the inner edge in the width direction of the light-shielding layer 128. That is, the routed wirings 134 are formed to extend in the area between the formed conductive sealing member 124a and the light shielding layer 128 (including the layer 128 width itself), run through the non-conductive sealing member 124b arranged on the short-side side of the substrate to protrude into the protruded area 129, and are connected to output terminals of the driving semiconductor element 127 mounted on the protruded area 129.

On the other hand, regarding the segment electrodes 130, segment electrode routed wirings 135 are routed out from the lower ends of the segment electrodes 130 toward the non-conductive sealing member 124b, and are connected to output terminals of the driving semiconductor element 127. A number of the routed wirings 134 and 135 transverse the non-conductive sealing member 124b on the lower-side side of the respective substrates 122 and 123. The non-connecting sealing member 124b is not electroconductive. Therefore, the routed wirings 134 and 135 which are arranged at a small pitch and transverse the non-conductive sealing member 124b are prevented from short-circuiting.

In this embodiment, each of these routed wirings 134 and 135 is made of a lamination film comprising the APC film and the ITO film, similarly to the segment electrodes 130. Moreover, input wirings 136 (that is, external input terminals) for supplying various signals to the driving semiconductor element 127 are formed so as to extend from the lower side of the lower substrate 122 toward the input terminals (not shown) of the driving semiconductor element 127.

Figure 17:
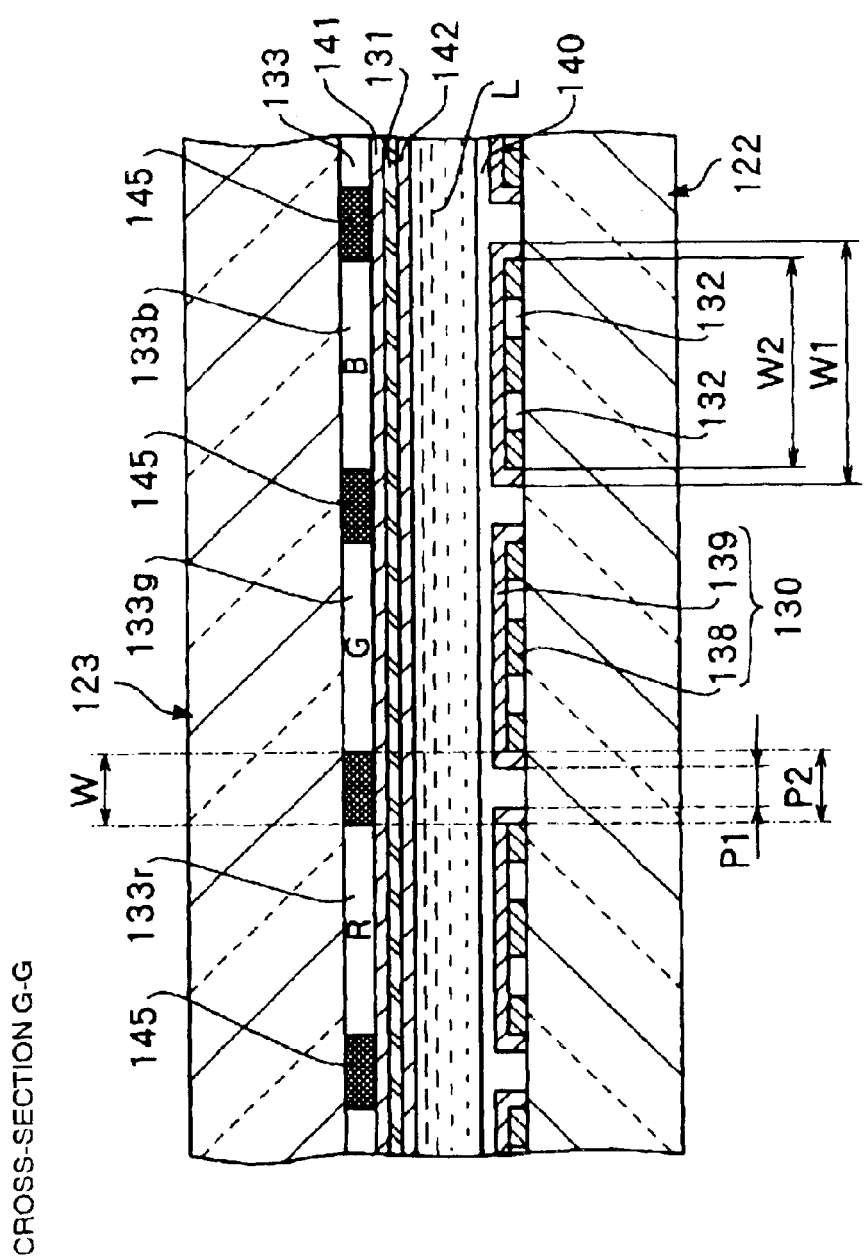
FIG. 17 is a cross-sectional view taken along line G—G in FIG. 16.

Referring to the cross-sectional structure of a pixel portion taken along line G—G in FIG. 16, the segment electrodes 130 each having a two-layer structure comprising the ITO film 139 laminated on the APC films 138 are formed on the lower substrate 122 of a transparent substrate made of glass, plastics, or the like in a stripe pattern as viewed in the direction perpendicular to the plane of the drawing paper as shown in FIG. 17. Moreover, an alignment film 140 made of polyimide or the like, having the surface rubbing-processed is formed thereon. In this embodiment, regarding the configuration of the segment electrode 130, the ITO film 139 is laminated onto only the upper surface of the APC film 138, and moreover, the width (W1) of the ITO film is set to be larger than the width (W2) of the APC film 138 so that the ITO film 139 also cover the side faces of the APC film 138.

On the other hand, the color filter 133 comprising the color matter layers 133r, 133g, and 133b for R, G, and B is formed on the upper substrate 123 of a transparent substrate made of glass, plastics, or the like. An overcoat layer 141 for eliminating the differences in height between the respective color matter layers and protecting the surfaces of the respective color matter layers is formed on the color filter 133. The overcoat layer 141 may be a resin film made of acryl, polyimide, or the like, or may be an inorganic film such as a silicon oxide film or the like.

The common electrodes 131 made of ITO single-layer films are formed on the overcoat layer 141 in a stripe pattern as viewed in the direction parallel to the drawing paper plane. For example, an alignment film 142 made of polyimide or the like, having the surface rubbing-processed, is formed thereon.

A liquid L comprising STN (Super Twisted Nematic) liquid crystal or the like is held between the upper substrate 123 and the lower substrate 122. Furthermore, a back light (not shown) is disposed on the lower surface side of the lower substrate 122.

Furthermore, a black stripe 145 is formed on the upper substrate 123. The black stripe 145 is made of, e.g., resin black, metal such as chromium having a relatively low reflectivity, or the like, and is formed so as to section the boundaries between the respective coloring matter layers 133r, 133g, and 133b for R, "C" A and B. In this embodiment, the width W of a black stripe 145 is larger than the interval P1 between the ITO films 139 of adjacent pixels, that is, the interval between the segment electrodes and is equal to the interval P2 between the APC films 138.

This will be described with reference to FIG. 16. The edge of ITO film 139 constitutes the outer line showing the profile of a segment electrode 130, while the edge of the APC film 138 constitutes the inner line. The line showing the profile of the black stripe 145 overlaps the line showing the edge of the APC film 138. That is, the transflective type color display is configured as follows. The width W of the black stripe 145 provided in the boundary between the coloring matter layers is larger than the interval P1 between the ITO films 139 of the segment electrode 130 and is substantially equal to the interval P2 between the APC patterns 138.

Figure 18:
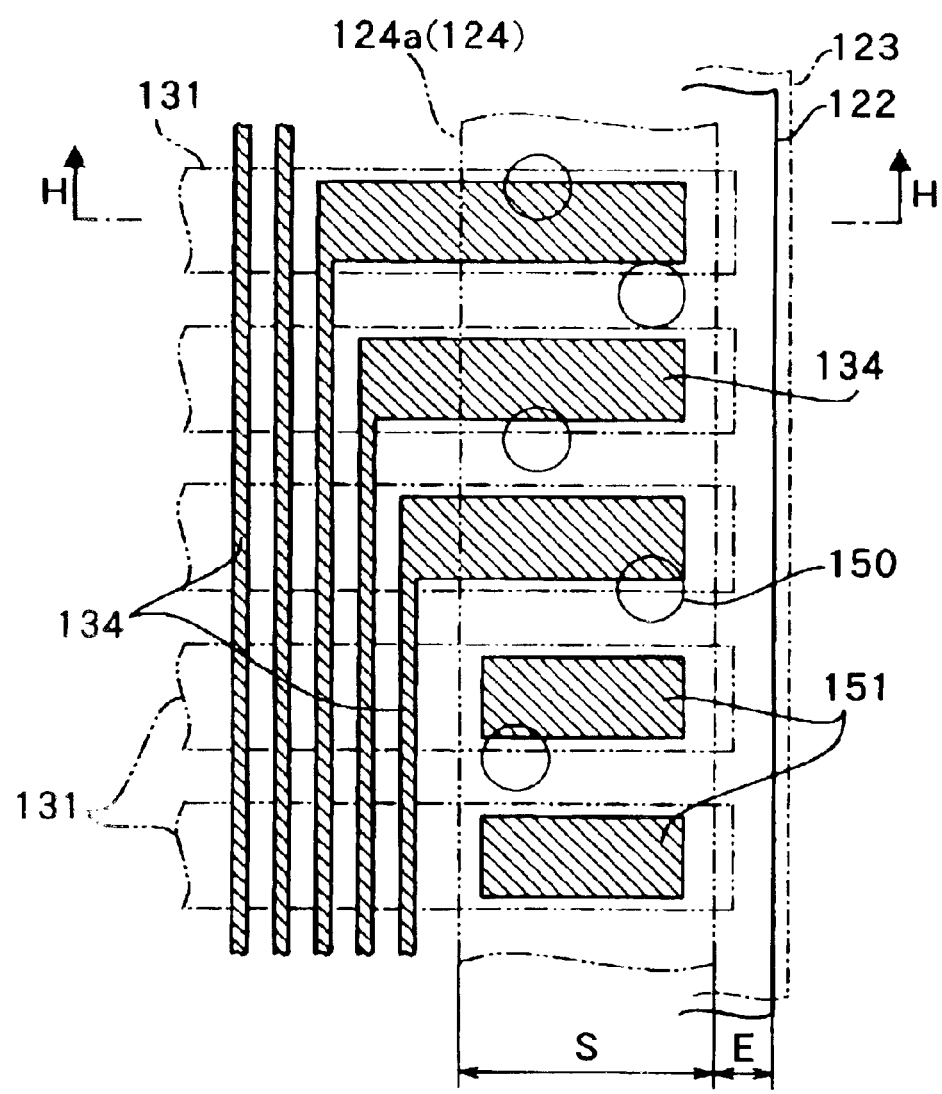
FIG. 18 is an enlarged view of the part indicated by arrow D in FIG. 15.
Figure 19:
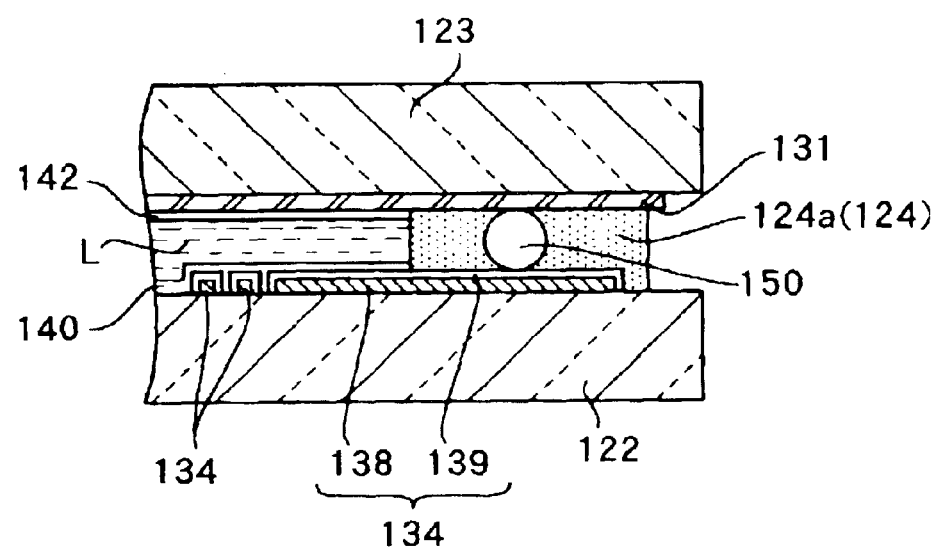
FIG. 19 is a cross-sectional view taken along line H—H in FIG. 18.

The area designated by reference character D in FIG. 15 is enlarged and shown in FIG. 18. Moreover, FIG. 19 shows a cross-sectional structure taken along line H—H in FIG. 18. The right ends of the three common electrodes 131 on the upper side shown in FIG. 18 are electrically connected to the routed wirings 134. On the other hand, the two common electrodes 131 on the lower side are electrically connected to the routed wirings 134 as shown in FIG. 15.

As shown in FIG. 18, the ends of the common electrodes 131 on the upper substrate 123 are protruded outside of the area in which the conductive sealing member 124a is formed. The ends of the routed wirings 134 on the lower substrate 122 are positioned in the area in which the conductive sealing member 124a is formed. Electro-conductive particles 150 with a diameter of about 10 μm are incorporated into the conductive sealing member 124a. These electroconductive particles 150 are present between and contact with the substrates 122 and 123 as shown in FIG. 19, and thereby, the common electrodes 131 on the upper substrate 123 and the routed wirings 134 on the lower substrate 122 are electrically connected to each other.

Referring to FIG. 19, each routed wiring 134 has a two-layer structure in which the ITO film 139 is laminated to the APC film 138, and the side faces of the APC film 138 are also covered with the ITO film 139 similarly to the segment electrodes 130 (see FIG. 17). Regarding the common electrodes 131 (e.g., the two common electrodes 131 on the lower side in FIG. 18) with the left ends being electrically connected to the routed wirings 134, the right ends thereof run through the conductive sealing member 124a, and dummy patterns 151 are formed on parts of the substrate which are opposite to the right ends of the common electrodes 131. The dummy patterns 151 have a two-layer structure in which the ITO film 139 is laminated onto the APC film 138, similarly to the routed wirings 134.

Regarding the common electrodes 131 (e.g., the three common electrodes 131 on the upper side in FIG. 18) with the right ends being connected to the routed wirings 134, the left ends pass through the conductive sealing member 124a as shown in FIG. 15. The dummy patterns 151 are also formed on the parts of the substrate which are opposite to the left ends of the common electrodes 131. In practice, the profile of the ITO films should be depicted in the peripheries of the APC films constituting the routed wirings 134 and the dummy patterns 151. The profiles of the ITO films are omitted to facilitate understanding of the drawing.

In this embodiment, each routed wiring 134 has a lamination structure comprising the APC film 138 and the ITO film 139 as shown in FIG. 19. If the overall layer thickness of the routed wiring 134 (that is, the total film thickness of the APC film 138 and the ITO film 139) is about 0.3 $\mu$m, ordinarily, the difference in height of 0.3 $\mu$m is caused between the portion of the sealing member 124 in which the routed wiring 134 is provided and the portion thereof in which no routed wirings 134 is provided. Probably, the display will be deficient, since the cell gap is dispersed.

On the other hand, in this embodiment, the dummy patterns 151 having the same shape and layer-thickness as those of the routed wirings 134 are disposed in the ends of the common electrodes 131 in which no routed wirings 134 are present. Therefore, the cell gap of the whole liquid crystal panel becomes constant irrespective of positions in the panel. Thus, deficiencies in the display can be prevented. Moreover, the routed wirings 134 and the dummy patterns 151 are formed using the same layer. When the dummy patterns are formed, it is necessary only to further prepare a mask pattern. Thus, the manufacturing process can be prevented from becoming complicate.

Furthermore, in this embodiment as shown in FIG. 17, the black stripes 145 are provided on the upper substrate 123 in such a manner as to completely cover the gap between the APC films 138 of adjacent segment electrodes 130. Thus, light leakage and color mixing can be prevented. As a result, the use of the APC films 138 having a high reflectivity enhances the brightness at displaying in the reflection mode, and simultaneously improves the color saturation in the transmission mode. Thus, a liquid crystal device with which the respective colors can be clearly visualized can be realized.

In this embodiment, the sealing member 124 comprises the conductive sealing member 124a and the non-conductive sealing member 124b. The sealing member 124 may comprise the connecting sealing member 124a only.

Moreover, in this embodiment, the configuration in which the driving semiconductor element 127 is mounted in the protruded area 129 is provided as shown in FIG. 15. Instead of this configuration, that is, without the driving semiconductor element 127 being mounted in the protruded area 129, the driving semiconductor element 127 may be disposed outside the liquid crystal device 120, e.g., via FPC (Flexible Printed Circuit) or the like, and the terminals of the driving semiconductor element 127 are connected to the external input terminals 136 through FPC, so that a signal can be supplied via the external connection terminals 136 directly to the routed wirings 134 and the routed wirings 135.

(Fourth Embodiment of Liquid Crystal Device)

Figure 23:
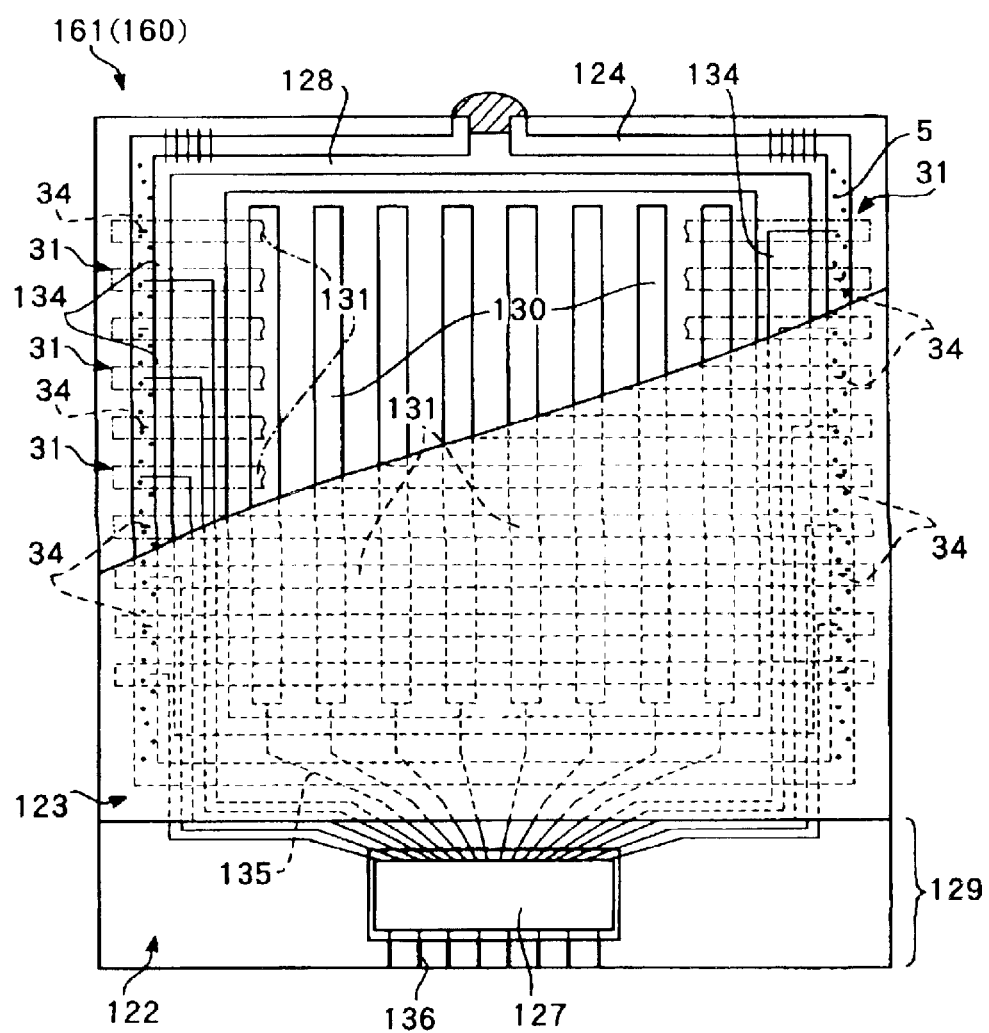
FIG. 23 is a partially cut-out plan view of a liquid crystal device according to yet another embodiment of the present invention.

FIG. 23 shows another embodiment of the liquid crystal device of the present invention. The basic configuration of a liquid crystal device 160 formed using a liquid crystal panel 161 is the same as that of the liquid crystal device 120 shown in FIG. 15. Thus, the detail description is omitted.

According to the embodiment shown in FIG. 15, for the upper half of a plurality of the common electrodes 131, the routed wirings 134 are routed from the right ends of the common electrodes 131, and for the common electrodes 131 present in the lower half, the routed wirings 134 are routed from the right ends of the common electrodes 131. On the other hand, according to this embodiment, for the highest common electrode 131 in FIG. 23, the routed wiring 134 is routed from the right end. For the second highest common electrode 131, the routed wiring 134 is routed from the left end. Like this, the routed wirings 134 are alternately routed from the right and left ends one by one. The other configuration is the same as that of the embodiment shown in FIG. 15.

In the liquid crystal device 160 of this embodiment, the routed wirings 134 and the electrodes 131 are electrically connected alternately on the right and left sides. The dummy patterns 34 are provided in the parts of the sealing member 4 which are opposite to the conductive areas 31 with the display area being sandwiched between them, respectively, in such a manner that the dummy patterns 34 run through the sealing member 4. Thereby, the cell gap of the liquid crystal panel 161 in the direction of the segment electrodes 131 can be kept constant.

(Embodiment of Electronic Apparatus)

Figure 10:
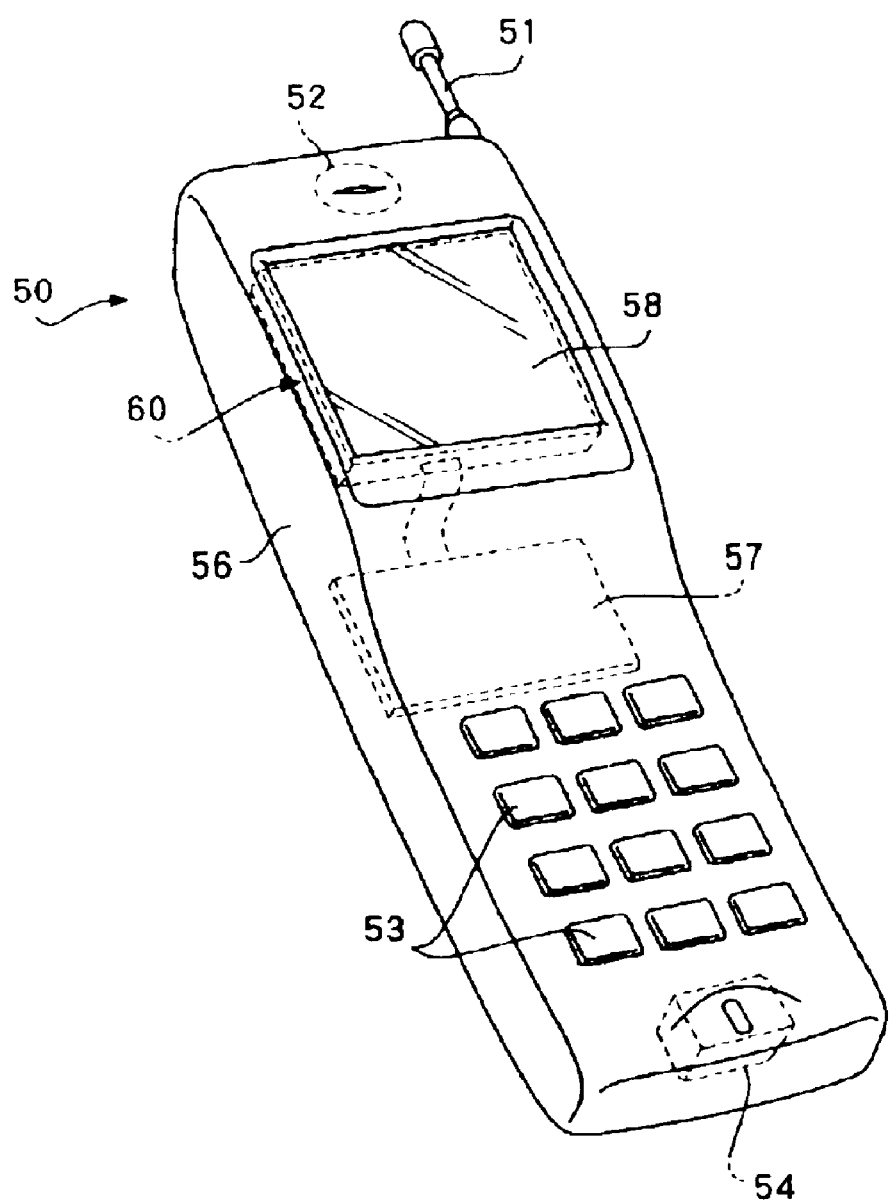
FIG. 10 is a perspective view showing an embodiment of a portable telephone as an example of the electronic apparatus of the present invention.

FIG. 10 is a portable telephone according to an embodiment of an electronic apparatus of the present invention. A portable telephone 50 shown in the drawing comprises different types of components such as an antenna 51, a speaker 52, a key switch 53, a microphone 54, and so forth housed in an outer case 56. A liquid crystal device 60, which functions as a display, and a control circuit substrate 57 are housed in the outer case 56.

The upper surface of the liquid crystal device 60 in FIG. 10 is a display surface. The part of the outer case 56 corresponding to the display surface is provided with a transparent cover 58 for protecting the liquid crystal device 60 and securing the viewing of the display surface. The liquid crystal device 60 may comprise, e.g., the liquid crystal display 1 shown in FIG. 1 or the liquid crystal device 41 shown in FIG. 6.

In the portable telephone 50 shown in FIG. 10, a signal input via the key switch 53 or the microphone 54, a data received via the antenna 51, and so forth are input to the control circuit on the control circuit substrate 57. The control circuit causes figures, letters, graphics, and so forth to be displayed on the display screen of the liquid crystal device 60 based on the various input data, and moreover, causes data to be transmitted via the antenna 51.

Figure 11:
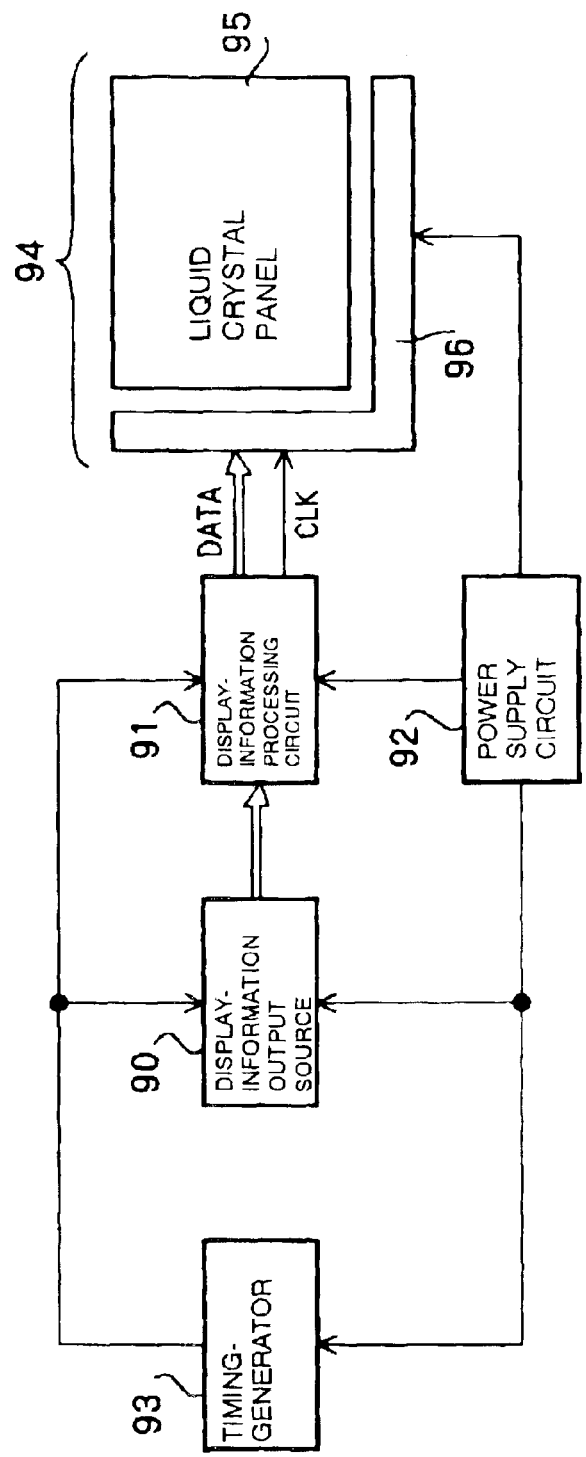
FIG. 11 is a block diagram showing another embodiment of the electronic apparatus of the present invention.
Figure 12:
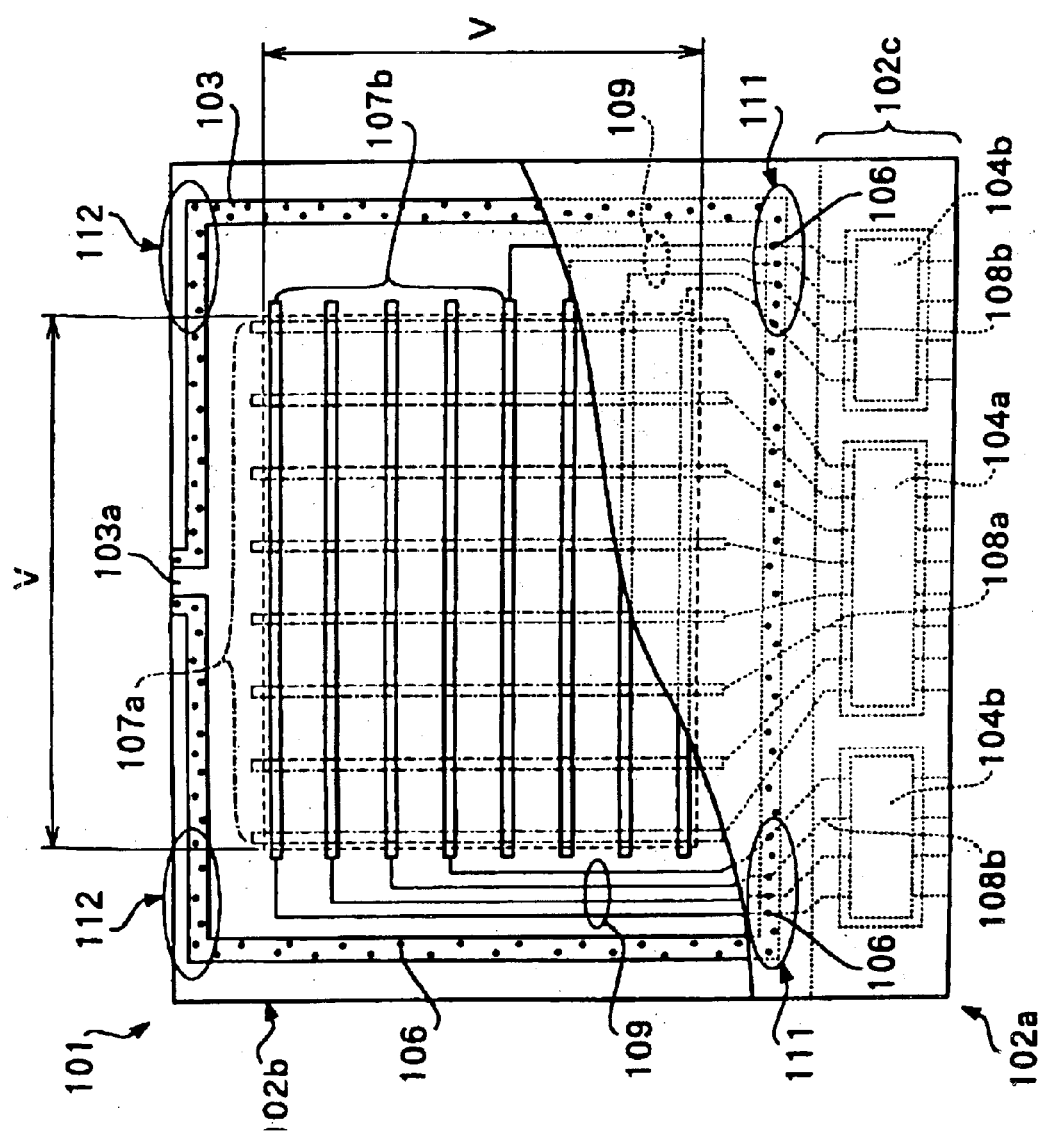
FIG. 12 is a partially cut-out plan view of an example of a conventional liquid crystal device.
Figure 13:
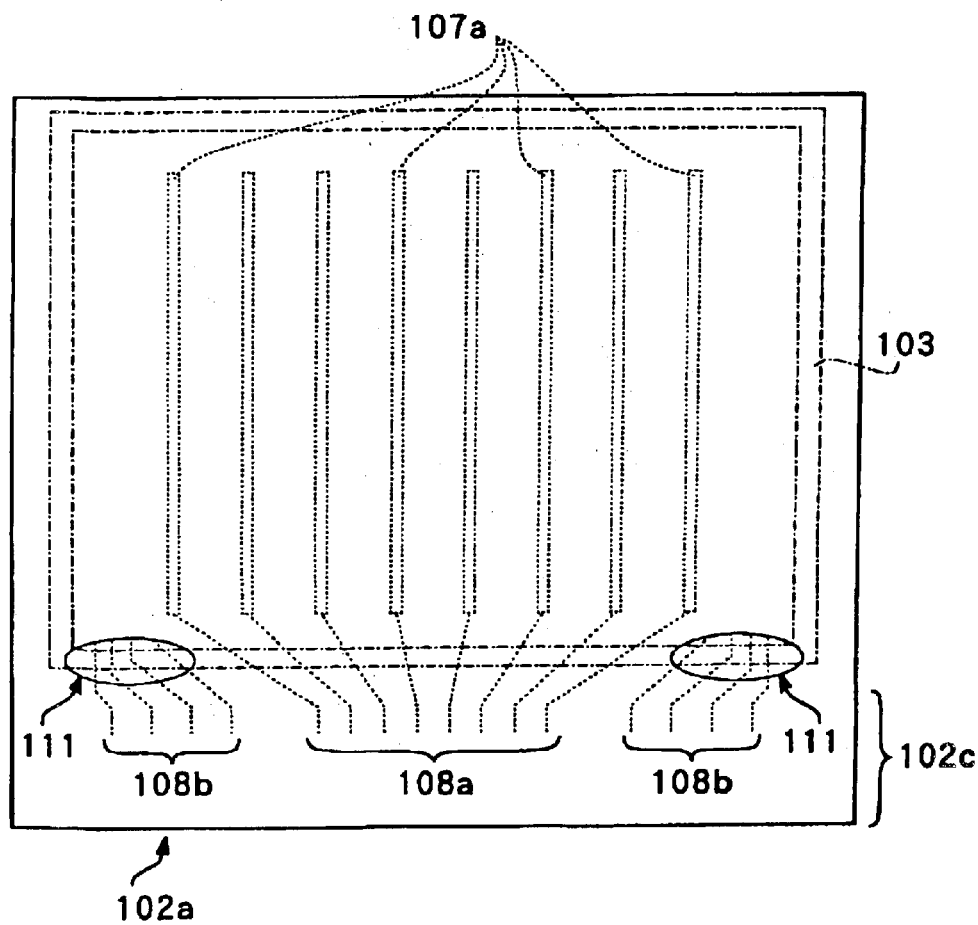
FIG. 13 is a plan view of one of the substrates constituting the conventional liquid crystal device of FIG. 12.
Figure 14:
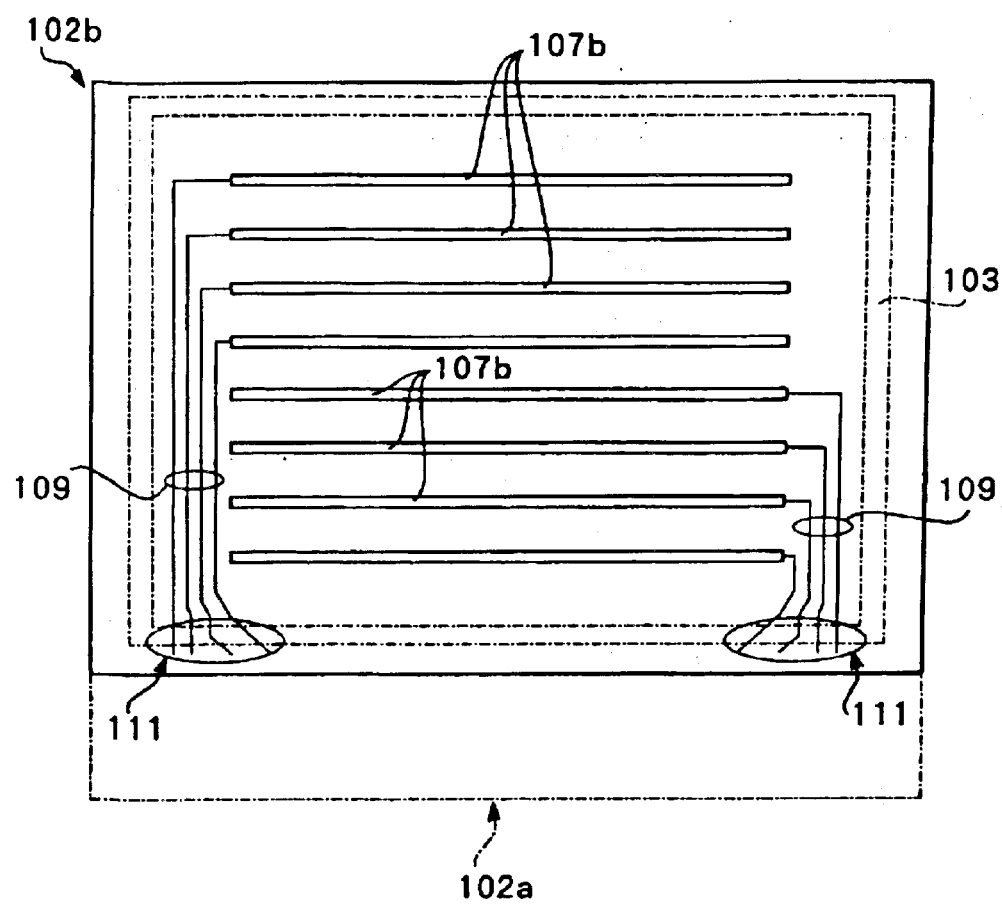
FIG. 14 is a plan view of the other substrate constituting the liquid crystal device of FIG. 12.

FIG. 11 shows a part of an electrical control system for use in the portable telephone shown in FIG. 10 and other electronic apparatuses. The electrical control system shown here comprises a display information output source 90, a display information processing circuit 91, an power supply circuit 92, a timing generator 93, and a liquid crystal device 94 as a display device. The liquid crystal device 94 comprises a liquid crystal panel 95 and a driving circuit 96. The liquid crystal device 94 may comprise the liquid crystal device 1 shown in FIG. 1 or the liquid crystal device 41 shown in FIG. 6.

The display information output source 90 is provided with memories such as ROM (Read Only Memory), RAM (Random Access Memory), and so forth, storage units such different types of disks, a tuning circuit for tuning and outputting a digital image signal, and so forth. The output source 90 supplies display-information such as an image signal in a predetermined format or the like to the display information processing circuit 91, base on various clock signals developed by the timing generator 93.

The display information processing circuit 91, provided with well-known circuits such as a serial-parallel conversion circuit, an amplifier inversion circuit, a rotation circuit, a gamma correction circuit, a clamping circuit, and so forth, processes the input display information, and supplies the image signal together with a clock signal CLK to the drive circuit 96. The drive circuit 96 comprises a scanning line drive circuit, a data line drive circuit, an inspection circuit, and so forth. Moreover, the power supply circuit 92 supplies predetermined voltages to the respective components.

(Other Embodiments)

Heretofore, the present invention is described with respect to the preferred embodiments. The present invention is not limited to the embodiments and variations may be made without departing from the scope of the invention.

For example, the above-description typically deals with the active matrix system liquid crystal device using the simple matrix type liquid crystal device and the TFD elements as the switching elements. The present invention may be applied to an active matrix system liquid crystal device having such a structure using a three terminal switching element such as TFT (Thin Film Transistor) as an active element.

Moreover, the electronic apparatus of the present invention is not limited to the portable telephone shown in FIG. 8. The electronic apparatus may be another optional electronic apparatus such as a portable information terminal device, a digital camera, and so forth.

According to the present invention, wirings run through a sealing member in a conductive area. A first dummy pattern runs through a part of the sealing member which is opposite to the conductive area. With this configuration, the interval between the substrates, that is, the cell gap can be kept constant all over the liquid crystal panel, compared with the conventional liquid crystal device having a structure in which wirings run through the sealing member only in a conductive area. Thus, the liquid crystal display qualities can be maintained on a high level.

The entire disclosure of Japanese Patent Application No. 2001-278777 filed Sep. 13, 2001 is incorporated by reference herein.

What is claimed is:

1. A liquid crystal device comprising:
   a pair of substrates bonded to each other with a sealing member, one of the substrates having a wiring-lead-out area;
   a conductive member disposed in the sealing member;
   a pair of conductive areas each formed on a different one of opposing sides of the sealing member bordering a display area, the opposing sides of the sealing member positioned perpendicular to the wiring-lead-out area;
   a pair of wirings connected to each other with the conductive member in each of the conductive areas, one of the wirings extending to the wiring-lead-out area, the other wiring extending to the display area; and
   a first dummy pattern running through a part of the sealing member opposite to a corresponding one of the conductive areas.

2. A liquid crystal device according to claim 1, wherein dimension of the first dummy pattern running through the sealing member is substantially equal to a dimension of the wirings running through the sealing member in the conductive area.

3. A liquid crystal device according to claim 1, wherein the first dummy pattern comprises a set of a plurality of linear dummy pattern elements formed in positions corresponding to the wirings present in the conductive area, respectively.

4. A liquid crystal device according to claim 3, wherein a width of the respective dummy pattern elements is substantially equal to a width of the corresponding wirings.

5. A liquid crystal device according to claim 1, wherein the least one of the pair of wirings runs through a second area of the sealing member excluding the conductive area, and a second dummy pattern is provided which runs through a part of the sealing member opposite to the second area.

6. A liquid crystal device according to claim 5, wherein a dimension of the second dummy pattern running through the sealing member is substantially equal to a dimension of the wirings running through the sealing member in the second area.

7. A liquid crystal device according to claim 5, wherein the second dummy pattern comprises a set of a plurality of linear dummy pattern elements formed in positions corresponding to the wirings present in the second area, respectively.

8. A liquid crystal device according to claim 7, wherein width of the respective dummy pattern elements is substantially equal to a width of the corresponding wirings.

9. A liquid crystal device comprising:
   a first substrate;
   a second substrate;
   a sealing member operable to bond said first substrate to said second substrate;
   a first wire in electrical contact with a second wire at a first conductive area formed within a first side of said sealing member;
   a third wire in electrical contact with a fourth wire at a second conductive area formed within a second side of said sealing member located opposite said first side of said sealing member;
   a first dummy pattern disposed within said sealing member at said second side of said sealing member, said first dummy pattern operable to maintain constant and uniform spacing between said first substrate and said second substrate; and
   a second dummy pattern disposed within said sealing member at said first side of said sealing member, said second dummy pattern operable to maintain constant and uniform spacing between said first substrate and said second substrate.

10. The liquid crystal device of claim 9, wherein said first dummy pattern has a width substantially similar to a width of said first wire and a width of said second wire.

11. The liquid crystal device of claim 9, further comprising a third dummy pattern positioned at a third side of said sealing member opposite a fourth side of said sealing member through which extends said first wire and said third wire, said third dummy pattern operable to maintain constant and uniform spacing between said first substrate and said second substrate.

12. An electronic apparatus comprising a liquid crystal device and a case accommodating the liquid crystal device, wherein the liquid crystal device comprises the liquid crystal device defined in claim 9.

* * * * *